US012596476B2

(12) United States Patent
Kim et al.

(10) Patent No.: US 12,596,476 B2
(45) Date of Patent: Apr. 7, 2026

(54) ELECTRONIC DEVICE FOR MANAGING STORAGE SPACE AND METHOD OF OPERATING THE SAME

(71) Applicant: Samsung Electronics Co., Ltd., Gyeonggi-do (KR)

(72) Inventors: Junho Kim, Gyeonggi-do (KR); Jaehong Cheon, Gyeonggi-do (KR); Hyejung Kim, Gyeonggi-do (KR); Seongsu Yoon, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 394 days.

(21) Appl. No.: 17/903,101

(22) Filed: Sep. 6, 2022

(65) Prior Publication Data

US 2023/0070501 A1     Mar. 9, 2023

Related U.S. Application Data

(63) Continuation of application No. PCT/KR2022/012834, filed on Aug. 26, 2022.

(30) Foreign Application Priority Data

Sep. 7, 2021   (KR) ........................ 10-2021-0119361
Nov. 15, 2021   (KR) ........................ 10-2021-0156622

(51) Int. Cl.
*G06F 3/06*          (2006.01)
*G06F 11/34*          (2006.01)
(Continued)

(52) U.S. Cl.
CPC .......... *G06F 3/0608* (2013.01); *G06F 3/0655* (2013.01); *G06F 3/0673* (2013.01);
(Continued)

(58) Field of Classification Search
CPC ...... G06F 11/34; G06F 16/122; G06F 16/168; G06F 16/1734; G06F 3/0605;
(Continued)

(56) References Cited

U.S. PATENT DOCUMENTS 9,497,136 B1 *  11/2016  Ramarao ............... G06F 9/5072
2005/0257003 A1   11/2005  Miyazaki et al.
(Continued)

FOREIGN PATENT DOCUMENTS

CN      106843868 A      6/2017
CN      109711206 A      5/2019
(Continued)

OTHER PUBLICATIONS

Zhang, Yong, "How parallel space helps you run multiple accounts on Android", Geekwire, https://www.geekwire.com/sponsor-post/parallel-space-helps-run-multiple-accounts-android/, pp. 1-5, 2016 (Year: 2016).*
(Continued)

*Primary Examiner* — Taelor Kim
(74) *Attorney, Agent, or Firm* — Sughrue Mion, PLLC

(57)          ABSTRACT

An electronic device may include a display, a memory, and at least one processor. The at least one processor may be configured to identify a first account and a second account associated with a user of the electronic device, store at least one first file associated with the first account in a first area of the memory, store at least one second file associated with the second account in a second area of the memory, identify a first memory usage of the first area of the memory associated with the first account, based on the first account, identify a second memory usage of the second area of the memory associated with the second account, based on the first account, and display a first execution screen including
(Continued)

first information about the first memory usage and second information about the second memory usage on the display.

17 Claims, 20 Drawing Sheets

(51) Int. Cl.
*G06F 16/11* (2019.01)
*G06F 16/16* (2019.01)
*G06F 16/17* (2019.01)
(52) U.S. Cl.
CPC ............ *G06F 11/34* (2013.01); *G06F 16/122* (2019.01); *G06F 16/168* (2019.01); *G06F 16/1734* (2019.01)
(58) Field of Classification Search
CPC .... G06F 3/0608; G06F 3/0637; G06F 3/0644; G06F 3/0655; G06F 3/0673
See application file for complete search history.

(56) References Cited

U.S. PATENT DOCUMENTS

| | | | |
|---|---|---|---|
| 2012/0260179 A1 | 10/2012 | Reshadi et al. | |
| 2013/0347102 A1* | 12/2013 | Shi ......................... | G06F 21/36 |
| | | | 726/19 |
| 2016/0063026 A1* | 3/2016 | Mokhtarzada ...... | G06F 16/2358 |
| | | | 707/617 |
| 2017/0206259 A1 | 7/2017 | Yang et al. | |
| 2018/0336543 A1 | 11/2018 | Van Os et al. | |
| 2019/0236317 A1 | 8/2019 | Simonson et al. | |
| 2019/0347181 A1 | 11/2019 | Cranfill et al. | |
| 2021/0004897 A1* | 1/2021 | Van Os ................... | G06F 16/24 |

FOREIGN PATENT DOCUMENTS

| | | | |
|---|---|---|---|
| JP | 2014-512050 A | 5/2014 | |
| JP | 6983261 B2 | 11/2021 | |
| KR | 10-2017-0085342 A | 7/2017 | |
| KR | 10-2017-0136305 A | 12/2017 | |
| KR | 10-2017-0136679 A | 12/2017 | |
| KR | 10-2018-0135549 A | 12/2018 | |
| KR | 10-2020-0039053 A | 4/2020 | |
| KR | 10-2181943 B1 | 11/2020 | |
| KR | 10-2021-0003253 A | 1/2021 | |

OTHER PUBLICATIONS

Shi, Luman et al., "Jekyll and Hyde" is Risky: Shared—Everything Threat Mitigation in Dual-Instance Apps, MoiSys '19: Proceedings of the 17th Annual International Conference on Mobile Systems, Applications, and Services, pp. 222-235 (Year: 2019).*
International Search Report dated Nov. 29, 2022.

\* cited by examiner

900

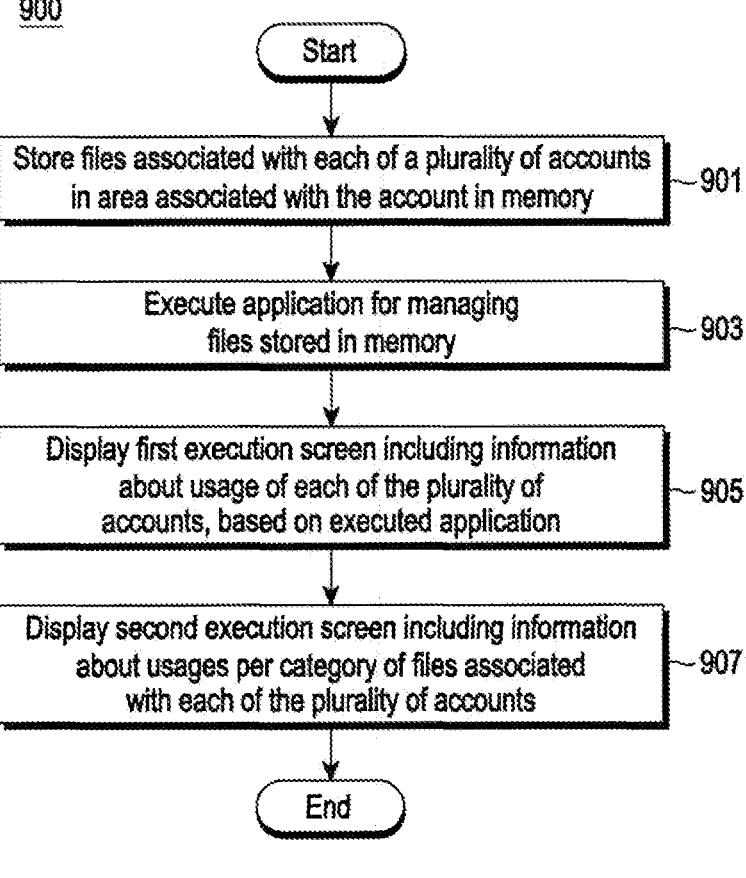

Start

Store files associated with each of a plurality of accounts in area associated with the account in memory   ~901

Execute application for managing files stored in memory   ~903

Display first execution screen including information about usage of each of the plurality of accounts, based on executed application   ~905

Display second execution screen including information about usages per category of files associated with each of the plurality of accounts   ~907

End

FIG. 9

ELECTRONIC DEVICE FOR MANAGING STORAGE SPACE AND METHOD OF OPERATING THE SAME

CROSS-REFERENCE TO RELATED APPLICATION(S)

This application is a continuation of International Application No. PCT/KR2022/012834, which was filed on Aug. 26, 2022, and claims priority to Korean Patent Application No. 10-2021-0119361, filed on Sep. 7, 2021, and claims priority to Korean Patent Application No. 10-2021-0156622, filed on Nov. 15, 2021, in the Korean Intellectual Property Office, the disclosures of which are incorporated by reference herein their entirety.

BACKGROUND

Field

Various embodiments of the disclosure relate to an electronic device for managing a storage space and a method of operating the same.

Description of Related Art

Along with the recent rapid development of electronic devices, electronic devices capable of wireless voice calls and information exchange have become a necessity. In the early stage of adoption of electronic devices, an electronic device was perceived simply as portable and capable of wireless communication. However, owing to the development of the technology and the introduction of wireless Internet, electronic devices have been used in an ever-widening range including games, a remote control based on short-range communication, and image capturing through an equipped digital camera as well as simple phone calls or schedule management, thus satisfying users' demands.

As various types of services are provided to consumers, the number of data, information, and/or files stored in the electronic devices is rapidly increasing.

Accordingly, there is a need for implementing a technique of efficiently providing information about data, information, and/or files stored in an electronic device.

SUMMARY

Various types of data, information, and/or files may be stored in an internal memory of an electronic device. In this case, different accounts (e.g., an account corresponding to a dual application, an account corresponding to a work profile, and an account corresponding to a secure folder) may be configured in the electronic device, and different storage spaces allocated to the accounts may be separated respectively for the accounts according to logical paths to the storage spaces. Accordingly, the electronic device may store data, information, and/or files obtained for each account in a different storage space (e.g., a storage area of the internal memory) for the account. However, there is no function of identifying information about data, information, and/or files stored in the storage space of another account in a specific account, and thus a user has difficulty in comprehensively identifying information about files in each account configured in the electronic device. To identify information about data, information, and/or files stored in the storage space of another account in a specific account, authentication with the other account is required, the operational load of the electronic device for the authentication increases, and the user's convenience for managing a large number of files is reduced.

According to various embodiments, an electronic device and a method of operating the same may provide an execution screen including all of information about the memory usage of each account based on an application (e.g., a file application) implemented to identify information about files stored in each account, thereby increasing a user's convenience in managing files.

Further, according to various embodiments, an electronic device and a method of operating the same may provide an analysis function for files stored in each account, thereby increasing a user's convenience in managing files.

According to various embodiments, an electronic device may include a display, a memory, and at least one processor. The at least one processor may be configured to identify a first account and a second account associated with a user of the electronic device, store at least one first file associated with the first account in a first area of the memory, store at least one second file associated with the second account in a second area of the memory, identify first memory usage of the first area of the memory associated with the first account, based on the first account, identify second memory usage of the second area of the memory associated with the second account, based on the first account, and display a first execution screen including first information indicating the first memory usage and second information indicating the second memory usage on the display.

According to various embodiments, a method of operating an electronic device may include identifying a first account and a second account associated with a user of the electronic device, storing at least one first file associated with the first account in a first area of a memory, storing at least one second file associated with the second account in a second area of the memory, identifying first memory usage of the first area of the memory associated with the first account, based on the first account, identifying second memory usage of the second area of the memory associated with the second account, based on the first account, and displaying a first execution screen including first information indicating the first memory usage and second information indicating the second memory usage on a display.

According to various embodiments, an electronic device may include a display, a memory, and at least one processor. The at least one processor may be configured to identify a first account and a second account associated with a user of the electronic device, store at least one first file associated with the first account in a first area of the memory, store at least one second file associated with the second account in a second area of the memory, execute a first application based on the first account, identify first memory usage of the first area of the memory associated with the first account, based on the first application executed based on the first account, identify second memory usage of the second area of the memory associated with the second account, based on the first application executed based on the first account, display a first execution screen of the first application, including a first object including first information about the first memory usage and a second object including second information about the second memory usage on the display, and based on the second object being selected between the first object and the second object, display the first execution screen of the first application including the at least one second file and a plurality of objects configured to provide a management function for the at least one second file. The management function may include at least one of move, copy, delete, or change name for a file.

According to various embodiments, the technical solutions are not limited to the above-described solutions, and those skilled in the art will clearly understand solutions not mentioned from the specification and the accompanying drawings.

According to various embodiments, an electronic device and a method of operating the same may be provided, which provide an execution screen including all of information about the memory usage of each account based on an application (e.g., a file application) implemented to identify information about files stored in each account, thereby increasing a user's convenience in managing files.

Further, according to various embodiments, an electronic device and a method of operating the same may be provided, which provide an analysis function for files stored in each account, thereby increasing a user's convenience in managing files.

BRIEF DESCRIPTION OF THE DRAWINGS

FIG. 9 is a flowchart illustrating an exemplary operation of an electronic device according to various embodiments;

DETAILED DESCRIPTION

Figure 1:
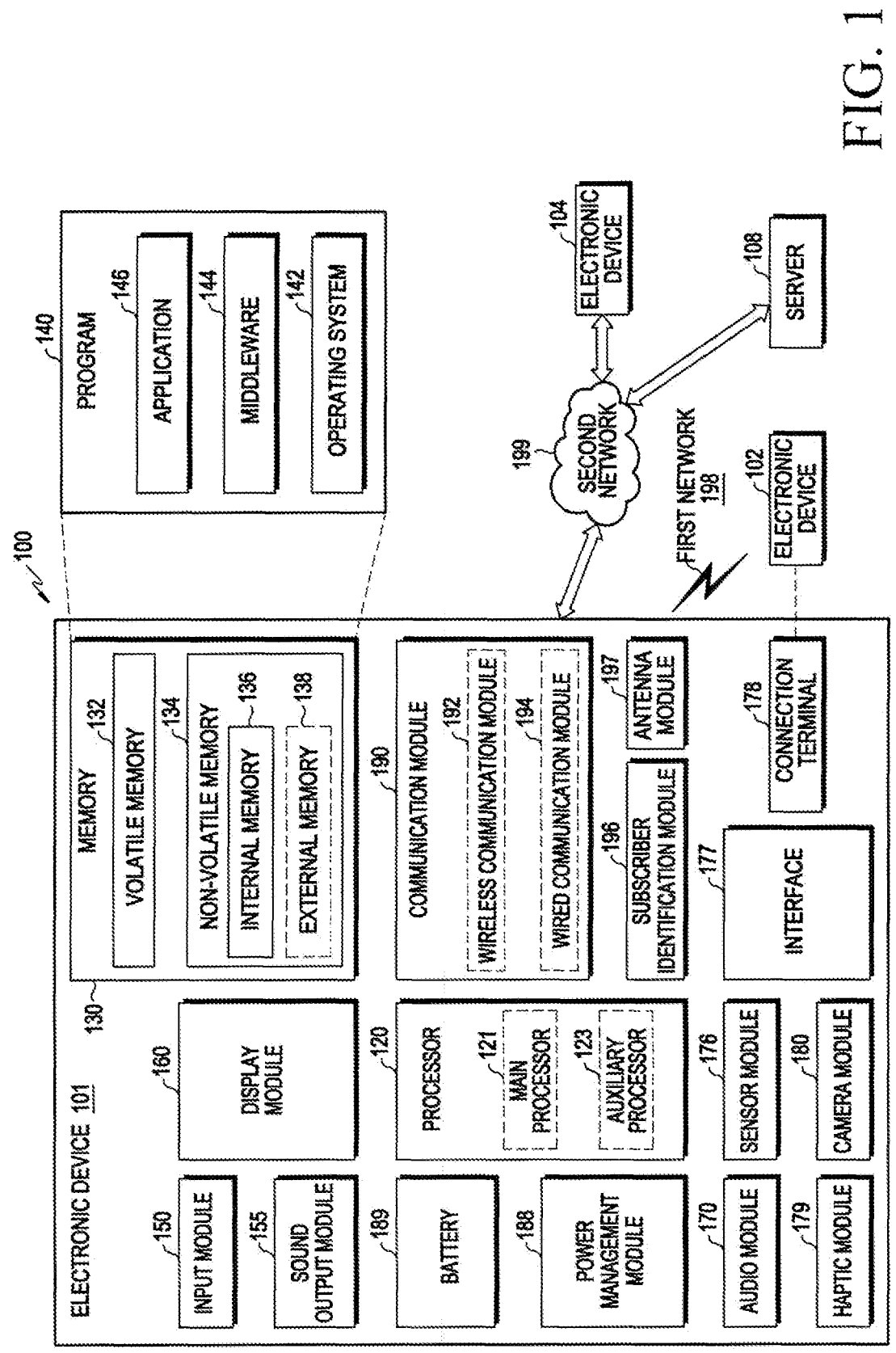
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

A description will be given below of an exemplary operation based on a user account in an electronic device 200 (e.g., the electronic device 101 of FIG. 1) according to various embodiments.

Figure 2:
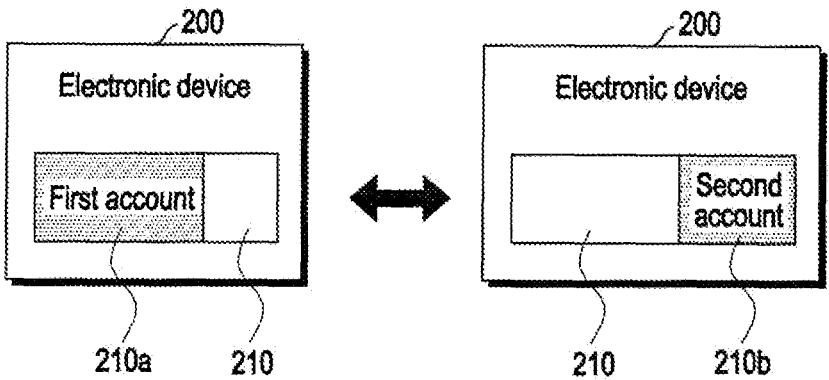
FIG. 2 is a diagram illustrating an exemplary operation based on information about an execution environment of a user in an electronic device according to various embodiments.

FIG. 2 is a diagram illustrating an exemplary operation based on information about an execution environment of a user in the electronic device 200 according to various embodiments.

According to various embodiments, referring to FIG. 2, the electronic device 200 may perform an operation based on information about a plurality of categories preset for a user in the electronic device 200. Examples of a user account according to various embodiments will be described below.

According to various embodiments, execution environment information about a user may be conceptual electronic information for classifying various types of information, data, and/or files separately from other execution environment information and storing the classified information, data and/or files in a local system such as the electronic device 200. For example, the execution environment information may include a user account, a user profile, identification information for separating storage spaces (e.g. memory partitions), user configuration information, and/or user setting information. For example, the execution environment information may include at least one of an account corresponding to a duplicate application (e.g., a dual application) of an application (or a program) configured to provide a dual app (or a dual messenger) function, a secure folder, a configurable user profile such as a work profile, or an external storage such as a cloud storage. In other words, execution environment information about the user corresponding to information generated in the electronic device 200 may be generated according to generation of a duplicate application (e.g., a dual application), a secure folder, a configurable user profile such as a work profile, or a cloud storage, for the user.

According to various embodiments, as illustrated in FIG. 2, storage spaces (e.g. memory partitions) in which data, information, and/or files are stored may be logically separated for different execution environments in the electronic device 200. For example, a different logical path (or address) may be configured for each piece of execution environment information, to store data, information, and/or files obtained for the execution environment information. Separate storage spaces of data, information, and/or files may be defined for different pieces of execution environment information (or an internal memory 210 (hereinafter, referred to as a memory, for convenience of description) may be divided into different storage areas 210a and 210b. To provide information about a storage space for each piece of execution environment information, the electronic device 200 may perform an operation of providing information about a storage space for each piece of execution environment information by a specific application (e.g., a file application), which will be described later.

According to various embodiments, the electronic device 200 may configure (or generate or identify) category information associated with the user in the electronic device 200 based on a user input. For example, upon receipt of a user input for using a dual app function (e.g., a dual messenger function) based on an application (or a program) (e.g., a messenger application) configured to provide the dual app function, the electronic device 200 may generate a dual account, generate a dual application corresponding to the application, identify a storage space allocated to a path (or an address) associated with the dual account, and/or generate a folder associated to the path (or the address). Information obtained based on the dual application may be stored in the identified storage space and/or the generated folder. Further, for example, upon receipt of a user input for generating a secure folder (e.g., an input for generating a secure folder based on a configured application), the electronic device 200 may generate a secure storage space/and or a secure folder, which is allocated to a specific path (or address).

While for convenience of description, execution environment information about a user will be described below as a user account, the disclosure is not limited thereto. Unless otherwise mentioned, an account described below may be understood as execution environment information, a profile, identification information for classifying a storage space, or configuration information.

An exemplary configuration of the electronic device 200 (e.g., the electronic device 101 of FIG. 1) according to various embodiments will be described below.

Figure 3:
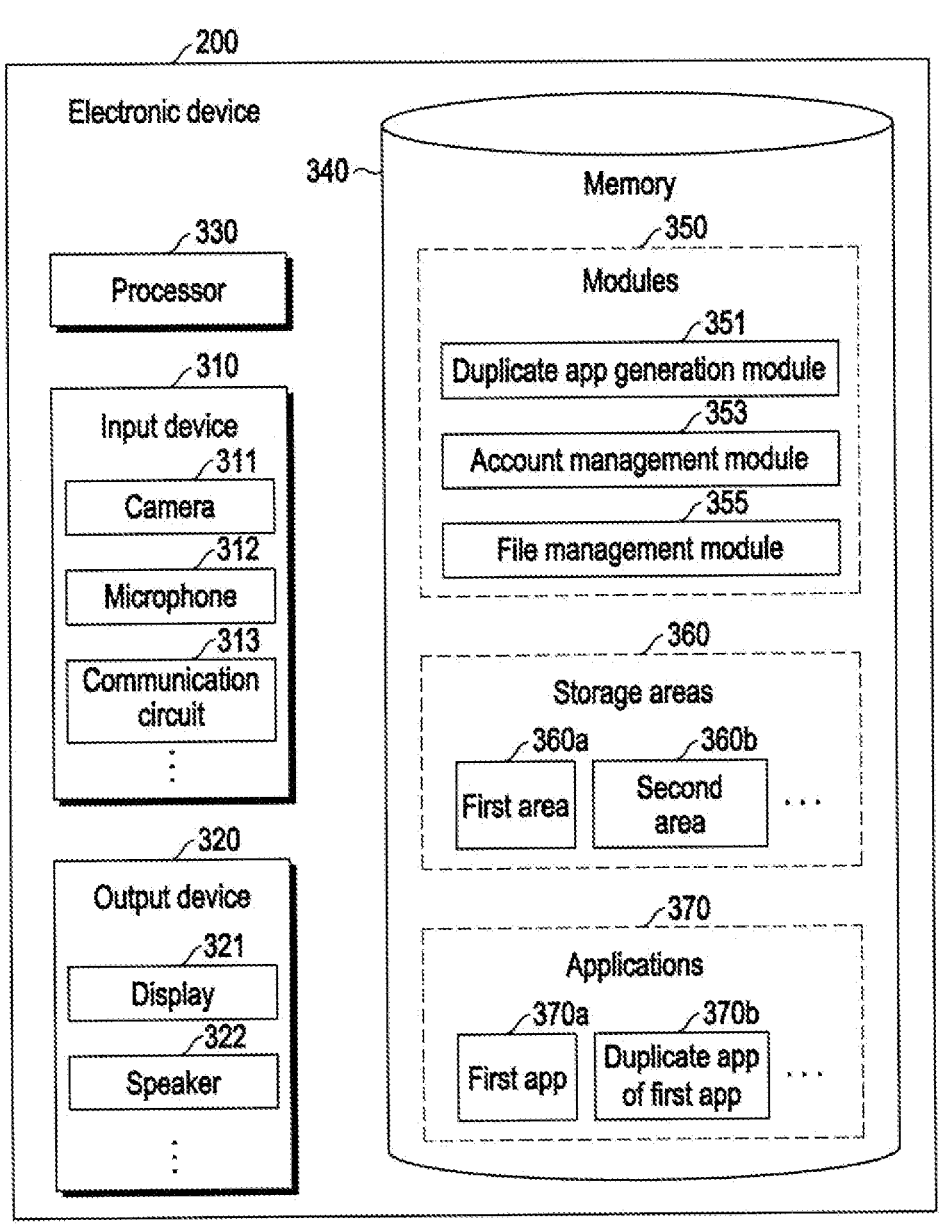
FIG. 3 is a diagram illustrating an exemplary configuration of an electronic device according to various embodiments.

FIG. 3 is a diagram illustrating an exemplary configuration of the electronic device 200 according to various embodiments. FIG. 3 will be described with reference to FIGS. 4A and 4B.

Figure 4A:
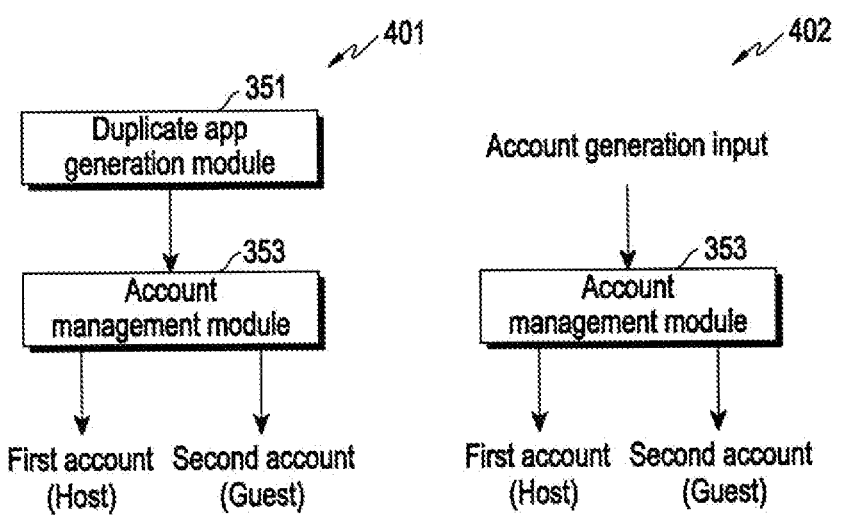
FIG. 4A is a diagram illustrating an example of account generation in an electronic device according to various embodiments.
Figure 4B:
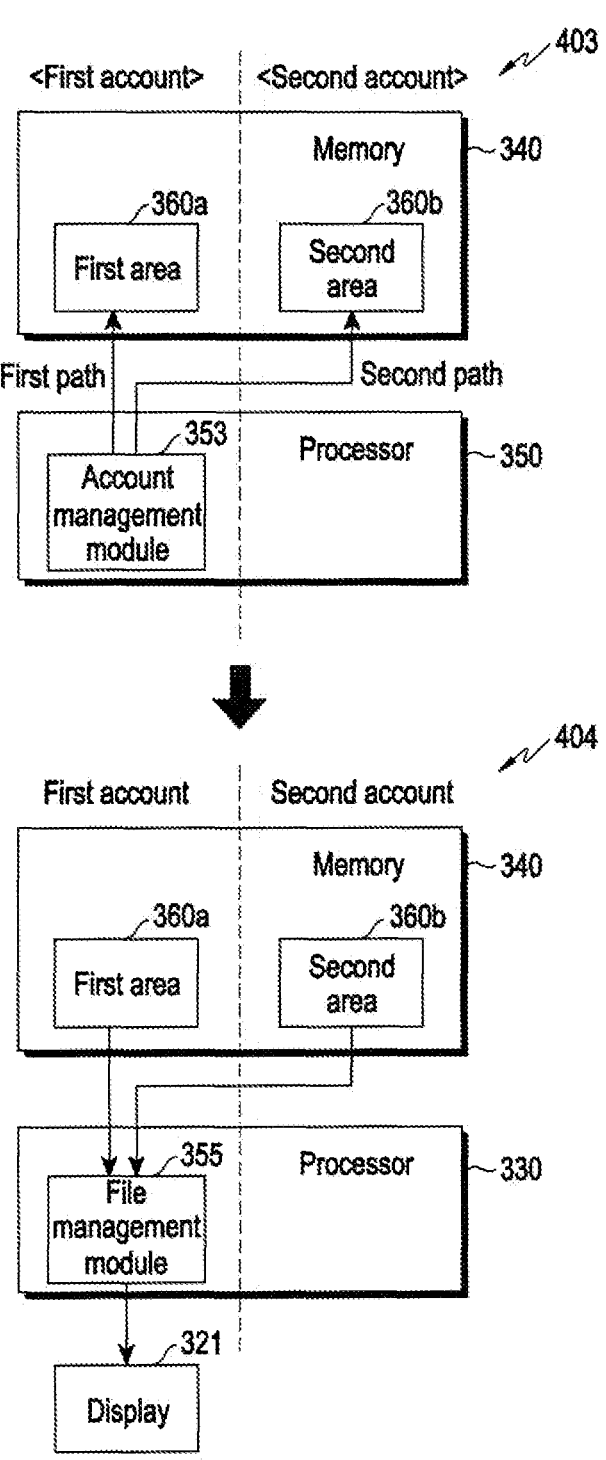
FIG. 4B is a diagram illustrating an exemplary operation of allocating a storage area (or storage space) for each account and an exemplary operation for a storage area based on an account in an electronic device according to various embodiments.

FIG. 4A is a diagram illustrating an example of account generation in the electronic device 200 according to various embodiments. FIG. 4B is a diagram illustrating an exemplary operation of allocating a storage area (or a storage space, memory partition) on an account basis, and an exemplary operation for a storage area based on an account in the electronic device 200 according to various embodiments.

According to various embodiments, as illustrated in FIG. 3, the electronic device 200 may include an input device 310, an output device 320, a processor 330, and a memory 340 that stores a plurality of modules 350 (e.g., a duplicate app generation module 351, an account management module 353, and a file management module 355) and applications 370, and includes a plurality of storage areas 360. The electronic device 200 may be implemented to include more components (or devices or electronic components) or fewer components, not limited to the description and/or the illustrating.

According to various embodiments, the modules (e.g., the duplicate app generation module 351, the account management module 353, and the file management module 355) implemented (or stored) in the electronic device 200 may be implemented in the form of an application, a program, computer code, instructions, a routine, a process, software, firmware, or a combination of at least two of them, executable by the processor 330. For example, when the modules (e.g., the duplicate app generation module 351, the account management module 353, and the file management module 355) are executed, the processor 330 may perform an operation corresponding to each of the modules. Therefore, when it is said that a specific module performs an operation, this may be understood to mean that as the specific module is executed, the processor 330 performs an operation corresponding to the specific module. Functions of at least some of the modules (e.g., the duplicate app generation module 351, the account management module 353, and the file management module 355) may be implemented in separate software, not limited to the description. For example, the account management module 353 and the file management module 355 may be implemented as some functions of an application (a file application described later) (or program) for managing files, as described later. Further, at least some of the modules (e.g., the duplicate app generation module 351, the account management module 353, and the file management module 355) may be implemented in hardware (e.g., as a processing circuit), not limited to the description.

An exemplary configuration of the electronic device 200 according to various embodiments will be described below.

According to various embodiments, the input device 310 may refer to devices for obtaining various types of information. For example, while the input device 310 may include a camera 311 (e.g., the camera module 180 of FIG. 1), a microphone 312, and a communication circuit 313 (e.g., the communication module 190 FIG. 1) as illustrated in FIG. 3, devices for obtaining various types of information may be further implemented as the input device 310 in the electronic device 200, not limited to the description and/or the illustration. For example, the devices described in relation to the input module 150 of FIG. 1 may be further implemented as the input device 310 in the electronic device 200.

According to various embodiments, the output device 320 may refer to devices that provide various types of content (e.g., visual content, auditory content, and tactile content) recognizable by the user (i.e., capable of stimulating the user's five senses). For example, the output device 320 may include a display 321 (e.g., the display module 160 of FIG. 1) and a speaker 322 (e.g., the audio module 170 of FIG. 1) as illustrated in FIG. 3. However, devices for providing content may be further implemented as the output device 320 in the electronic device 200, not limited to the description and/or the illustration.

According to various embodiments, the processor 330 may include at least one of an AP, a CPU, a GPU, a display processing unit (DPU), or a neural processing unit (NPU). As described above, the processor 330 may perform an operation (or provide a function) according to execution of the modules (e.g., the duplicate app generation module 351, the account management module 353, and the file management module 355). Operations of the modules (e.g., the duplicate app generation module 351, the account management module 353, and the file management module 355) described below may be understood as operations of the processor 330.

According to various embodiments, the duplicate app generation module 351 may generate a duplicate application (e.g., a duplicate app 370b of a first app 370a) of an application (e.g., the first app 370a) stored (or installed) in the electronic device 200. For example, the duplicate app generation module 351 may generate a duplicate application (or a dual application) of an application (an original application) supporting a dual app function, based on a dual app function provided by the OS (e.g., Android OS) of the electronic device 200. Although the dual app function has been described as a function provided by Android OS, the dual app function may be provided by another type of OS (e.g., IOS), not limited to the description. Alternatively, a function similar to the dual app function may be provided by another type of OS (e.g., IOS). As the duplicate application is generated by the duplicate app generation module 351, a duplicate icon corresponding to the duplicate application may be generated. The duplicate icon of the generated duplicate application displayed on a home screen may be visually distinguished from an original icon of the original application. For example, the duplicate icon may further include a specific object, compared to the original icon, and the specific object may be disposed (or positioned) at a specific position (e.g., a corner) of the duplicate icon.

According to various embodiments, the account management module 353 may generate a plurality of accounts for the user of the electronic device 200. The plurality of accounts may include a host account (or a main account) (e.g., a first account) and a guest account (e.g., a second account). The host account may be defined as an account configured by default in the electronic device 200, and the guest account may be defined as an account configured in a state in which the host account has been configured. An independently operated storage space and/or virtual execution environment (or a sandbox) separated from a storage space and/or execution environment based on the host account may be implemented based on the guest account. In an embodiment, the account management module 353 may generate the host account (e.g., the first account). While the host account may be performed based on a user input, the host account may be generated irrespective of a user input, not limited to the description. In an embodiment, referring to 401 of FIG. 4A, when a dual application (or a dual messenger application) is generated based on the duplicate application generation module 351, the account management module 353 may generate a guest account (e.g., a second account) corresponding to the dual application (or a dual messenger application). Further, in an embodiment, referring to 402 of FIG. 4A, the account management module 353 may generate the guest account (e.g., the second account) based on an input for generating the guest account. For example, the account management module 353 may identify the input for generating the guest account based on an application (or a program) implemented to provide a function for generating a guest account. For example, upon receipt of a user input for generating guest accounts (e.g., a work profile and a secure folder) based on an application (e.g., a setting application) implemented to provide a function for generating a profile such as a work profile, or a secure folder, the electronic device 200 may generate the guest accounts (e.g., the work profile and the secure folder).

Upon receipt of a user input for generating guest accounts (e.g., an independent storage space and/or a separate virtual execution environment separated from a storage space and/or an execution environment of the host account) based on an application implemented to generate an independent storage space or virtual execution environment, the electronic device 200 may generate the guest accounts (e.g., the independent storage space and/or the separate virtual execution environment), not limited to the illustrated example. The account management module 353 may generate identification information for identifying a plurality of accounts (e.g., a host account and a guest account) from each other, and manage the plurality of accounts based on the identification information. For example, the electronic device 200 may generate an identifier (ID) having a first number (e.g., "No. 0") corresponding to the host account (or main account), and generate an ID having a second number (e.g., at least one of "No. 95 to No. 99") corresponding to a guest account.

According to various embodiments, referring to 403 of FIG. 4B, the account management module 353 may allocate a specific storage area (or storage space) (e.g., a first area 360a and a second area 360b) in the memory 340, for each of the plurality of accounts (e.g., the afore-described first account as the host account and the afore-described second account as the guest account) configured in the electronic device 200. For example, the account management module 353 may generate a specific paths and/or specific addresses (e.g., a block of addresses) in which files are to be logically stored, based on the identification information generated for each account, and allocate the generated specific paths and/or specific addresses to the account. An area (e.g., the first area 360a or the second area 360b) of the physical memory 340 may correspond to the specific path and/or the specific address for each account (e.g., the first account or the second account). Accordingly, the electronic device 200 (e.g., the processor 330) may obtain files stored in the area of the memory 340 corresponding to the identified specific path and/or specific address. For example, the account management module 353 may generate a path and/or an address for "/memory/identification information (e.g., userID, userNumber)/ . . . " based on identification information (e.g., userID, userNumber) about an account, and allocate the generated path and/or address to the account having the identification information. Accordingly, as at least a part of an operation of storing data, information and or a file associated with a specific account, the electronic device 200 (e.g., the processor 330) may store the data, information, and/or file in an area of the memory 340 in a specific path and/or at a specific address corresponding to the specific account. The data, information, and/or file may include a media file such as an image, a video, and voice data, a text file, a document file, and an Android package (APK) file. The data, information, and/or file may include any file in a format storable in the electronic device 200, not limited to the description.

The area (e.g., the first area 360a) of the memory 340 corresponding to the host account (e.g., the first account) may include the area of the memory 340 (e.g., the second area 360b) corresponding to the guest account (e.g., the second account). For example, the account management module 353 may allocate "/memory/ . . . " to the host account, and allocate "/memory/guest account identification information/ . . . " which is a lower path of the path corresponding to the host account (e.g., the first account) to the guest account. Accordingly, the second area 340b of the memory 340 corresponding to the path "/memory/guest account identification information/ . . . " to the guest account (e.g., the second account) may be included in the first area 340a of the memory 340 corresponding to the path "/memory/ . . . " to the host account (e.g., the first account). Therefore, as described later, the electronic device 200 may identify the memory usage of files associated with the host account (e.g., the first account) by subtracting a second memory usage for the path corresponding to the guest account (e.g., the second account) from a memory usage for the path corresponding to the host account (e.g., the first account).

According to various embodiments, the file management module 355 may identify information about the usage of the memory 340 for data, information, and/or a file stored in a specific storage area of the memory 340 based on a plurality of accounts. For example, referring to 404 of FIG. 4B, the file management module 355 may identify the usage of the first area 340a of the memory 340, associated with the host account (e.g., the first account) based on the host account (e.g., the first account). For example, referring to 404 of FIG. 4B again, the file management module 355 may identify the usage of a storage area (e.g., the second area 360b) corresponding to another guest account (e.g., the second account) based on the host account (e.g., the first account). The electronic device 200 may provide the identified usage amount through the display 321. As described later, the file management module 355 (e.g., the file application described later) may be configured to have an authority or function (e.g., an application programming interface (API)) for identifying the usage of the memory 340 corresponding to each account (e.g., the host account and the guest account). In a state in which the file management module 355 is executed based on the host account, information about the memory usage of another guest account may be identified based on the authority or function.

According to various embodiments, the file management module 355 may perform at least one of an analysis operation or a management operation for data, information, and/or a file stored in a specific storage area of the memory 340 based on a plurality of accounts. The analysis operation may include classifying the data, information, and/or file into categories. For example, the file application may be implemented to have the authority and/or function to identify storage paths of files for each account and identify categories corresponding to the files stored in the identified storage paths. The authority and/or the function may be an authority or a function supported by a specific version (e.g., version 12) (or S OS) of Android OS. The management operation may include performing a function such as move, copy, share, or delete for the data, information, and/or file. As described later, the file management module 355 (e.g., the file application described later) may be configured to have an authority and/or function (e.g., API) to enable access to the path of files in the account and reading from/writing to the files. For example, the file application may obtain the authority and/or function for the management operation for each account based on user authentication for the account.

An exemplary operation of the electronic device 200 according to various embodiments will be described below.

According to various embodiments, the electronic device 200 (e.g., the processor 330 may display an execution screen including information about the memory usage of each of accounts (e.g., a host account and a guest account corresponding to a dual messenger, a secure folder, or a work profile) relative to a total usage of the memory 340. The usages of the above different accounts may be identified separately from the total usage of the memory 340 on the displayed execution screen.

Figure 5:
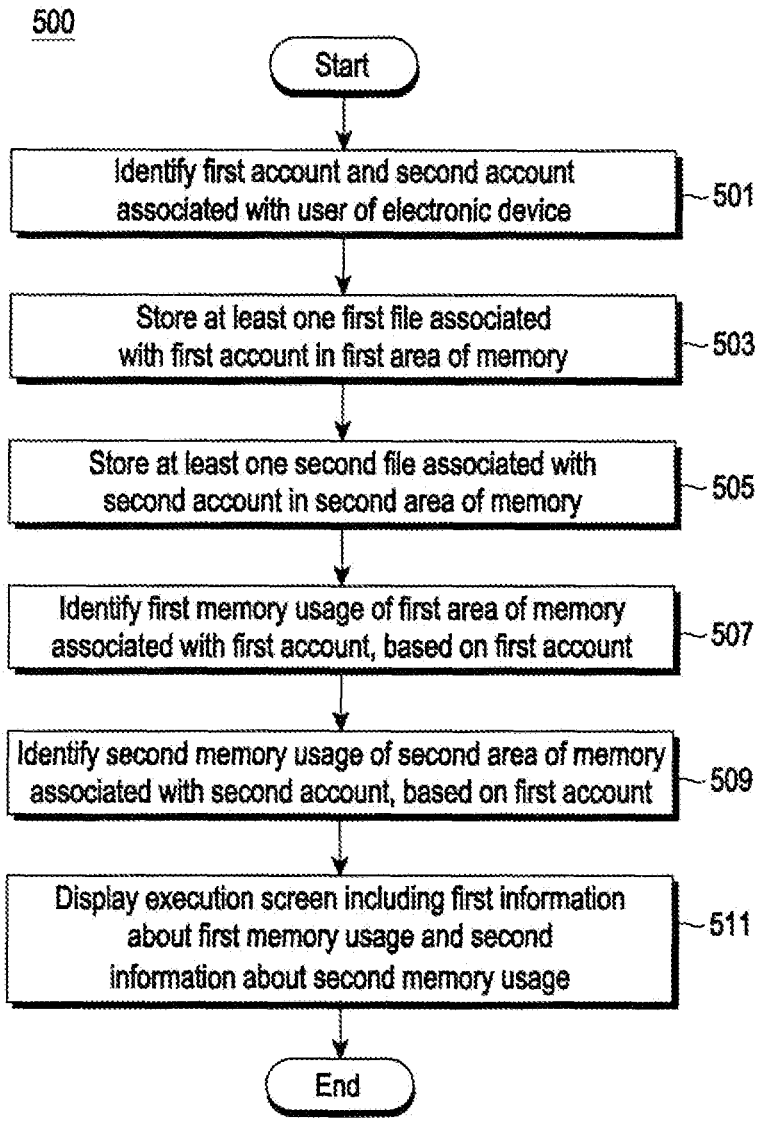
FIG. 5 is a flowchart illustrating an exemplary operation of an electronic device according to various embodiments.

FIG. 5 is a flowchart 500 illustrating an exemplary operation of the electronic device 200 according to various embodiments. According to various embodiments, the operations illustrated in FIG. 5 may be performed in various orders, not limited to the illustrated order. According to various embodiments, more operations than those illustrated in FIG. 5 or at least one operation fewer than those illustrated in FIG. 5 may be performed. FIG. 5 will be described with reference to FIGS. 6A and 6B.

Figure 6A:
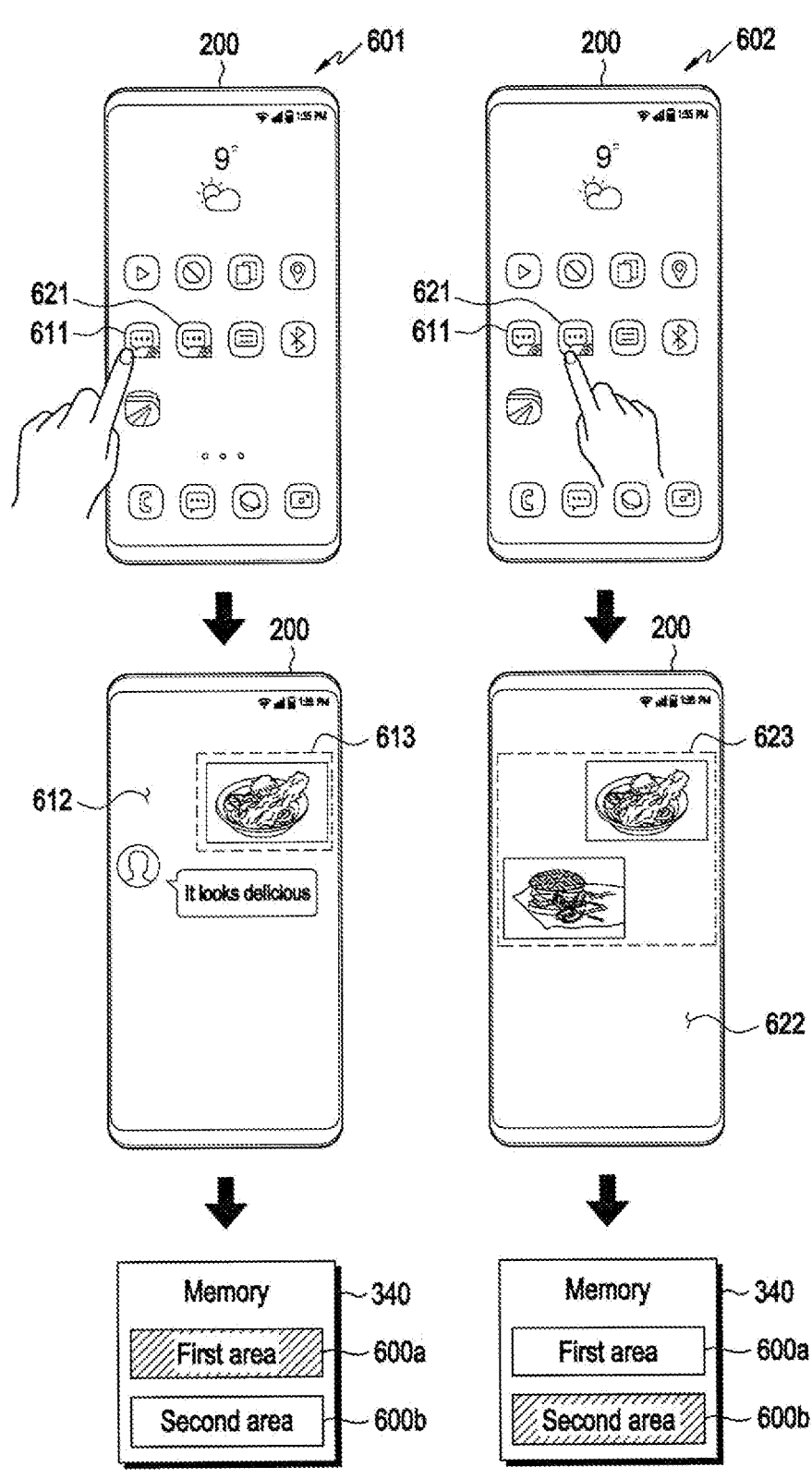
FIG. 6A is a diagram illustrating an exemplary operation of storing data, information, and/or a file on an account basis in an electronic device according to various embodiments.
Figure 6B:
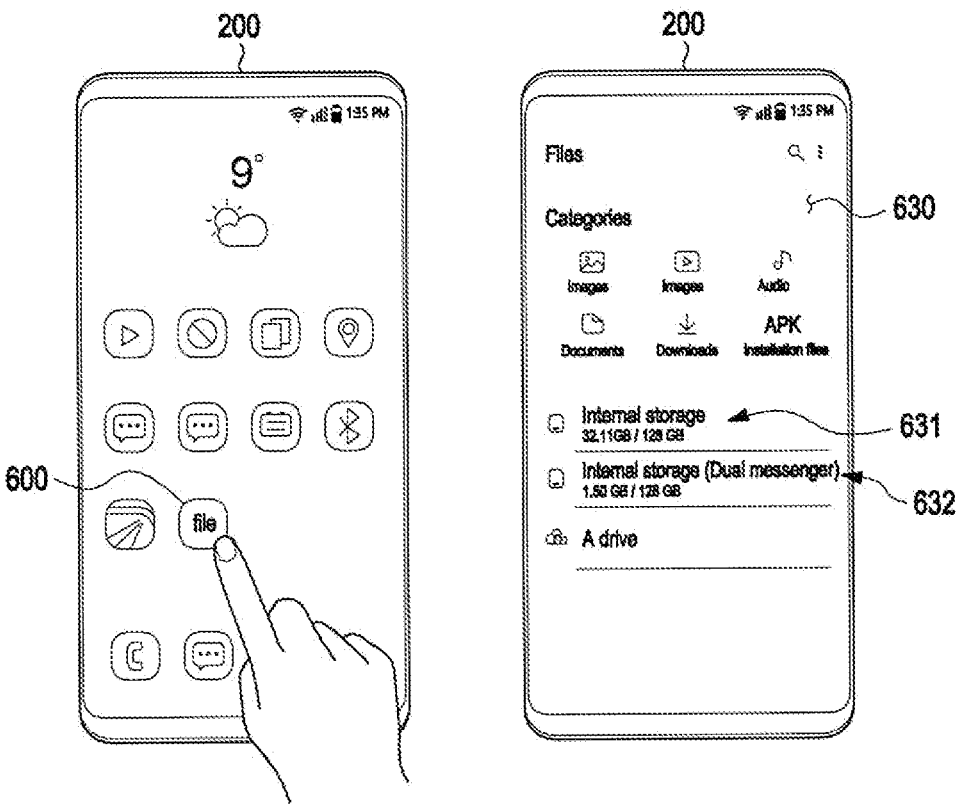
FIG. 6B is a diagram illustrating an exemplary operation of displaying an execution screen including information about the memory usage of a guest account together with a total usage of a memory in an electronic device according to various embodiments.

FIG. 6A is a diagram illustrating an exemplary operation of storing data, information, and/or a file on an account basis in the electronic device 200 according to various embodiments. FIG. 6B is a diagram illustrating an exemplary operation of displaying an execution screen including information about the memory usage of a guest account along with a total usage of the memory 340 in the electronic device 200 according to various embodiments.

According to various embodiments, the electronic device 200 may identify a first account and a second account associated with the user of the electronic device 200 in operation 501. The electronic device 200 may generate a plurality of accounts associated with the user. As described before, the electronic device 200 (e.g., the account management module 353) may generate a host account (e.g., the first account) and a guest account (e.g., the second account) based on the duplicate app generation module 351. For example, the guest account may include an account corresponding to a dual application (e.g., a dual messenger application 621), an account corresponding to a secure folder, and an account corresponding to a profile such as a work profile, and may include an account corresponding to an independent storage space and/or a virtual execution environment generated in the electronic device 200, not limited to the description. Since the operation of generating a plurality of accounts in the electronic device 200 (e.g., the account management module 353) has been described before with reference to FIGS. 3, 4A, and 4B, a redundant description will be avoided. Unless otherwise specified, the first account is defined as the host account and the second account is defined as the guest account, for convenience of description, which should not be construed as limiting.

According to various embodiments, the electronic device 200 may store at least one first file associated with the first account in a first area (e.g., "partition") 600a of the memory 340 in operation 503, and store at least one second file associated with the second account in a second area (e.g., "partition")600b of the memory 340 in operation 505. For example, the electronic device 200 may store data, information, and/or a file obtained during an operation based on each of the accounts (e.g., the first account and the second account) in an area (e.g., the first area 600a or the second area 600b) of the memory 340 associated with a path (or address) corresponding to identification information allocated to the account (e.g., the first account or the second account).

For example, referring to FIG. 6A, the electronic device 200 may store data, information, and/or a file associated with each of an original messenger application 611 and the dual messenger application 621 generated based on a dual messenger function. As noted above, a dual messenger allows a user to be logged-on to a single messenger using multiple simultaneously active accounts, to which may be assigned different memory partitions or areas. As described above, the data, information, and/or file may include a media file such as an image, a video, and voice data, a text file, a document file, and an APK file, and may include any file in a format storable in the electronic device 200, not limited to the description.

For example, referring to 601 of FIG. 6A, when the electronic device 200 obtains data, information, and/or a file based on execution of the original messenger application 611, the electronic device 200 may store the data, information, and/or file in the first area 600a of the memory 340. As at least a part of the operation of obtaining data, information, and/or a file based on execution of the original messenger application 611, the electronic device 200 may perform an operation of downloading at least a part of data, information, and/or a file that another external electronic device 200 has uploaded to a chat room 612 configured for a dialogue with a user of the other external electronic device 200 and an operation of screen-capturing the chat room 612. The downloading may be performed based on a download function provided by the messenger application 611 based on selection of at least a part 613 of the data, information, and/or file displayed in the chat room 612. The first area 600a of the memory 340 may be an area associated with a path (or address) corresponding to the host account (e.g., the first account).

Further, for example, referring to 602 of FIG. 6A, when the electronic device 200 obtains data, information, and/or a file 623 based on execution of the dual messenger application 621, the electronic device 200 may store the data, information, and/or file 623 in the second area 600b of the memory 340. The operation of obtaining the data, information, and/or file 623 based on the dual messenger application 621 of the electronic device 200 may be performed in a chat room 622, like the afore-described operation of obtaining data, information, and/or a file based on the original messenger application 611 of the electronic device 200, and thus a redundant descriptions will be avoided. The second area 600b of the memory 340 may be an area associated with a path (or address) corresponding to the guest account (e.g., the second account).

According to various embodiments, the areas of the memory 340 associated with the accounts, respectively may be different based on the paths (or addresses) corresponding to the accounts.

According to various embodiments, in operation 507, the electronic device 200 may identify a first memory usage of the memory 340 associated with the first account based on the first account. For example, the electronic device 200 may identify the usage (e.g., the first memory usage) of the memory 340 associated with the host account (e.g., the first account) using a file application 600. The file application 600 may include an application (or program) implemented to provide information about files stored in the memory 340 of the electronic device 200 and manage the files. For example, the file application 600 may be a My File application. The file application 600 may be configured to use an authority and/or a function (e.g., API) to identify the usage of the memory 340 associated with the host account (e.g., the first account). In an embodiment, the electronic device 200 may identify the total usage of the memory 340 (or the usage of the internal memory in the electronic device 200) based on the file application 600, and identify the usage (e.g., the first memory usage) of the memory 340 associated with the host account (e.g., the first account) by subtracting the usage of the memory 340 associated with the guest account (e.g., the second account) from the identified total usage of the memory 340. When the path of the host account (e.g., the first account) is configured as a higher path (e.g., "memory/ . . . ") for that of the other guest account, the electronic device may identify the usage of the first area 600a of the memory 340 corresponding to the host account (e.g., the first account) as a part of the operation of identifying the total usage of the memory 340. As at least a part of the operation of identifying the total usage of the memory 340, the electronic device 200 may calculate (or identify or obtain) the total capacity of data, information, and/or files stored in the memory 340 based on the function (e.g., API) of identifying the total usage of the memory 340, and identify the calculated total capacity as the total usage of the memory 340. The operation of identifying the usage (e.g., the second memory usage) of the memory 340 associated with the guest account (e.g., the second account) will be described later with reference to operation 507. According to an embodiment, the electronic device 200 may calculate (or identify or obtain) the size (or capacity) of data, information, and/or files stored in the area (e.g., the first area 600a) of the memory 340 corresponding to the path (or address) associated with the host account (e.g., the first account) based on the file application 600, and identify the calculated capacity as the usage of the memory 340 associated with the host account (e.g., the first account).

According to various embodiments, in operation 509, the electronic device 200 may identify the second memory usage of the second area 600b of the memory 340 associated with the second account based on the first account. For example, the electronic device 200 may identify the usage of the memory 340 associated with the guest account (e.g., the second account), using the file application 600 executed based on the host account (e.g., the first account). In an embodiment, the file application 600 may be configured to have (or to be associated with) at least one of an authority or a function (e.g., API) (hereinafter, referred to as a memory usage request authority or function) that enables identification of the usage (e.g., the second memory usage) of the memory 340 associated with the guest account (e.g., the second account). Further, in an embodiment, the file application 600 may be configured to have and/or use an authority and/or a function (e.g., API) (hereinafter, referred to a memory management authority or function) to access the area (e.g., the second area 600b) of the memory 340 associated with the guest account (e.g., the second account) and read/write from/to the area. In a state in which the electronic device 200 is set to the host account, the electronic device 200 may identify the usage (e.g., the second memory usage) of the memory 340 associated with the guest account (e.g., the second account), based at least one of the afore-described memory usage request authority (or function) or the afore-described memory management authority (or function). In an embodiment, in the state in which the electronic device 200 is set to the host account (e.g., the first account), the electronic device 200 may obtain the usage (e.g., the second memory usage) of the memory 340 associated with the guest account (e.g., the second account) from preconfigured information including the usage (e.g., the second memory usage) of the memory 340 associated with the guest account (e.g., the second account) (or preconfigured information with the second memory usage recorded therein) using at least one of the afore-described memory usage identification authority or function by the file application 600 executed based on the host account (e.g., the first account). Further, in an embodiment, in the state in which the electronic device 200 is set to the host account (e.g., the first account), the electronic device 200 may access the area (e.g., the second area 600b) of the memory 340 associated with the path (or address) corresponding to the guest account (e.g., the second account) using at least one of the afore-described memory management authority or function by the file application 600 executed based on the host account (e.g., the first account), calculate (or identify or obtain) the size (or capacity) of data, information, and/or files stored in the area (e.g., the second area 600*b*) of the memory 340, and identify the calculated size as the usage (e.g., the second memory usage) of the memory 340. The memory management authority (or function) may be used to provide a function of managing a file associated with an account, which will be described later.

According to various embodiments, the file application 600 may be configured to have the afore-described different types of authorities (e.g., the memory usage request authority and the memory management authority) according to the type of the guest account (e.g., the second account) and whether the guest account has been authenticated. For example, security may be different for each type of guest account (e.g., second account). That is, the types of guest accounts (e.g., second accounts) may include a guest account (e.g., second account) with relatively high security and a guest account (e.g., second account) with relatively low security. The security refers to security for data, information, and/or a file, and it may be understood that as the security is higher, the difficulty of accessing the data, information, and/or file increases. The file application 600 may have the memory usage request authority (or function) for identifying the usage of the memory 340 for each account regardless of the security of the account, and have an authority for a memory management function for each account according to the security of the account and whether the account has been authenticated. That is, the high security may mean that user authentication is required for the management function. In an embodiment, when authentication is not performed for a specific account of the high security type, the file application 600 may be configured to have the memory usage request authority and/or function without the memory management authority and/or function, for the specific account. When authentication is performed for the specific account, the file application 600 may be configured to have the afore-described memory usage request authority and/or function and the afore-described memory management authority and/or function. Accordingly, the electronic device 200 may authenticate the high-security guest account (e.g., second account), and when the memory management authority and/or function is configured for the file application 600 based on completion of the authentication, provide the file application 600 with the management function for files associated with the guest account (or the second account). The management function will be described later. For example, the account of the high security type may be an account corresponding to a secure folder or a profile such as a work profile. In an embodiment, for a specific account of the low security type, the file application 600 may be configured to have at least one of the afore-described memory usage request authorization and/or function or the afore-described memory management authority and/or function, regardless of whether the specific account is authenticated. For example, the account of the low security type may be an account corresponding to the afore-described dual application (e.g., the dual messenger application 621).

According to various embodiments, in operation 511, the electronic device 200 may display an execution screen including first information about the first memory usage and second information about the second memory usage. For example, as illustrated in FIG. 6B, the electronic device 200 may display an execution screen 630 of the file application

600, including information 631 about the first memory usage (e.g., 32.11 GB) of the host account (e.g., the first account) and information 632 about the second memory usage (e.g., 1.50 GB) of the guest account (e.g., the second account), identified based on the file application 600. The electronic device 200 may execute the file application 600 based on the host account. The file application 600 may identify the memory usage (e.g., the first memory usage) of the host account (e.g., the first account) and the memory usage (e.g., (e.g., second memory usage) of the guest account (e.g., the second account), using the afore-described authority and/or function for the host account (e.g., the first account), and generate (obtain) the execution screen 630 including the information 631 about the identified memory usage (e.g., the first memory usage) of the host account (e.g., the first account) and the information 632 about the identified memory usage (e.g., second memory usage) of the guest account (e.g., the second account). The execution screen 630 of the file application 600 may be a home screen of the file application 600. The home screen 630 of the file application 600 may include an area configured to provide information about files under each of a plurality of categories (e.g., images, video, audio, documents, downloads, and installation files) and a recent area including information (e.g., thumbnails and file names) about recently stored files, as well as the information 631 and 632 about the memory usages of the respective accounts (e.g., the first account and the second account). Referring to FIG. 6B, the electronic device 200 may provide each of the first memory usage (e.g., 32.11 GB) and the second memory usage (e.g., 1.5 GB) together with the total capacity (e.g., 128 GB) of the memory 340. For example, the execution screen of the file application 600 may include information about the first memory usage (e.g., 32.11 GB)/the total capacity (e.g., 128 GB) of the memory 340 and information about the second memory usage (e.g., 1.5 GB)/the total capacity (e.g., 128 GB) of the memory 340. Accordingly, the user may identify the usage of each account (e.g., the host account and the guest account) relative to the total capacity of the memory 340.

According to various embodiments, the electronic device 200 may perform the above operation based on another application (e.g., a gallery application) configured to use the authority and/or function (e.g., API) to identify the usage of the memory 340 for each of the afore-described accounts (e.g., the host account and the guest account), in addition to the afore-described file application 600.

While the operation of the electronic device 200 has been described in the context of the original messenger application 611 and the dual messenger application 621, by way of example, this operation of the electronic device 200 may be applied adaptively to an exemplary operation of the electronic device 200 for other types of original applications and dual applications, and/or other types of host accounts and guest accounts (e.g., a secure folder and a work profile), not limited to the described example.

Exemplary operations of the electronic device 200 according to various embodiments will be described below.

According to various embodiments, the electronic device 200 (e.g., the processor 330) may display an execution screen of a file application, including information about the memory usage of each account (e.g., a host account and a guest account corresponding to at least one of a dual messenger, a secure folder, or a work profile) relative to the total usage of the internal memory 340. The file application may be implemented to provide an analysis function and a management function for the usage of each of the accounts (e.g., the host account and the guest account corresponding to at least one of the dual messenger, the secure folder, or the work profile). The analysis function may include a function of classifying files stored for each account into categories. The management function may include at least one of a delete function, a save function, a move function, or a copy function for the files stored for each account.

Figure 7:
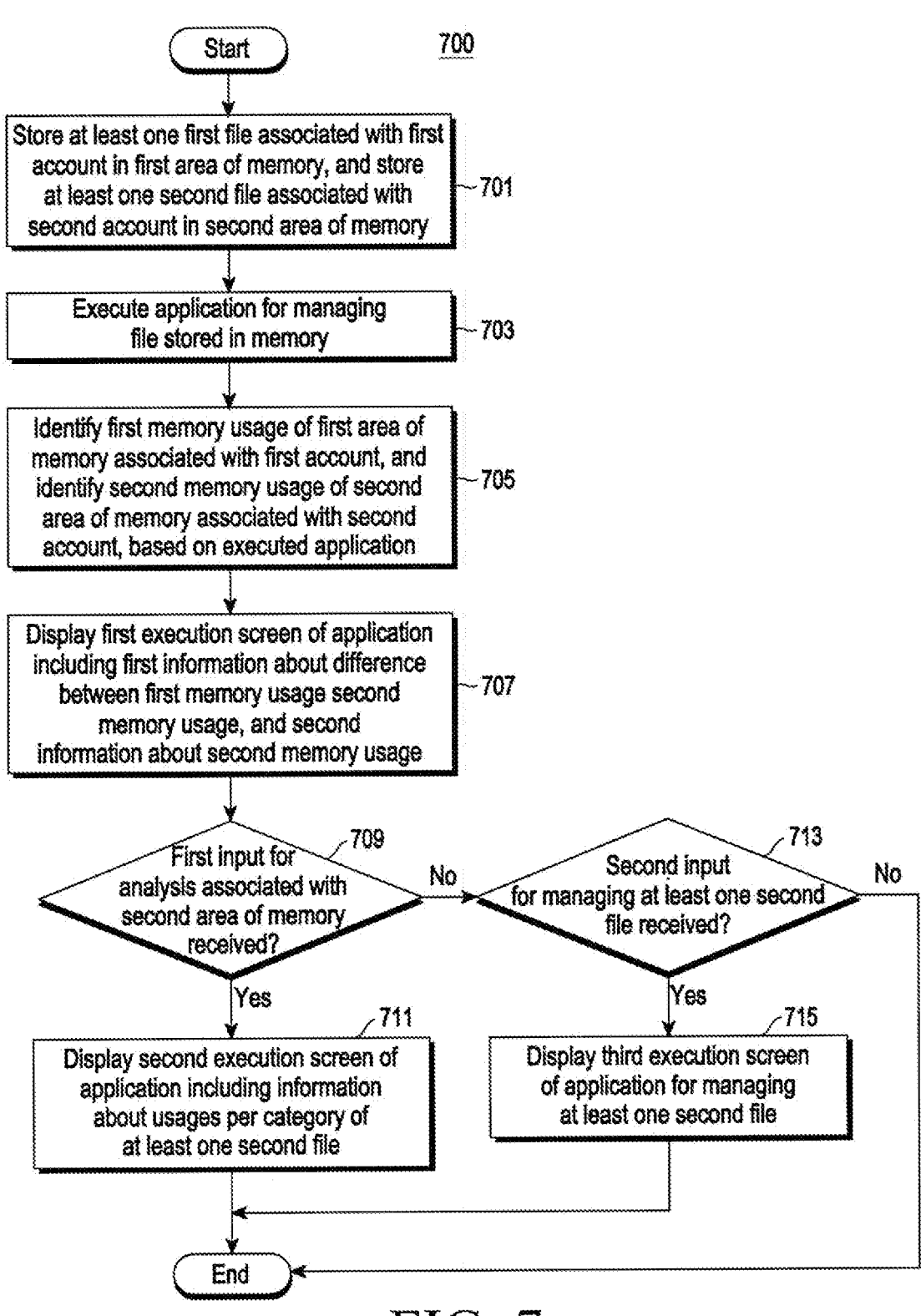
FIG. 7 is a flowchart illustrating an exemplary operation of an electronic device according to various embodiments.

FIG. 7 is a flowchart 700 illustrating an exemplary operation of the electronic device 200 according to various embodiments. According to various embodiments, the operations illustrated in FIG. 7 may be performed in various orders, not limited to the illustrated order. According to various embodiments, more operations than those illustrated in FIG. 7 or at least one operation fewer than those illustrated in FIG. 7 may be performed. FIG. 7 will be described with reference to FIGS. 8A and 8B.

Figure 8A:
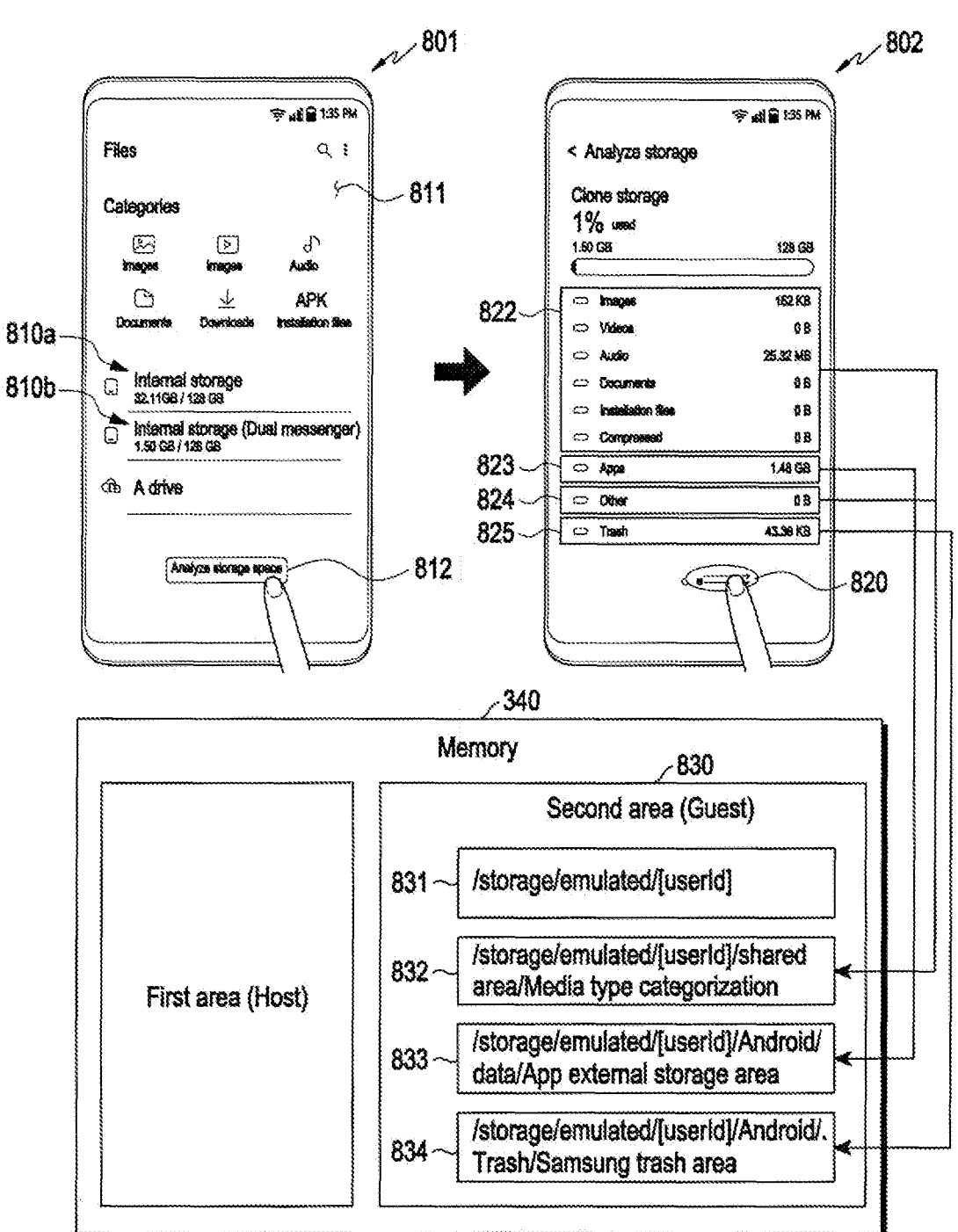
FIG. 8A is a diagram illustrating an exemplary operation of analyzing data, information, and/or a file on an account basis based on a file application in an electronic device according to various embodiments.
Figure 8B:
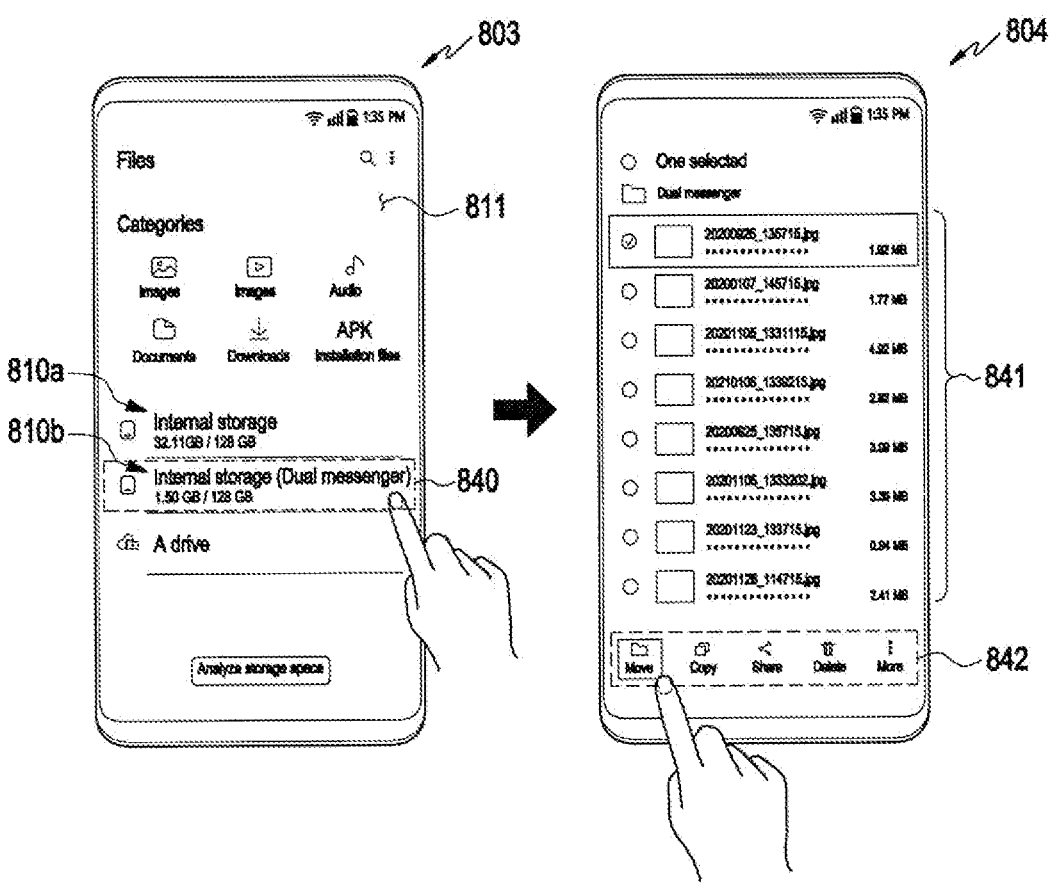
FIG. 8B is a diagram illustrating an exemplary operation of managing data, information, and/or a file on an account basis based on a file application in an electronic device according to various embodiments.

FIG. 8A is a diagram illustrating an exemplary operation of analyzing data, information, and/or a file on an account basis based on a file application of the electronic device 200 according to various embodiments. FIG. 8B is a diagram describing an exemplary operation of managing data, information, and/or a file on an account basis based on a file application of the electronic device 200 according to various embodiments.

According to various embodiments, in operation 701, the electronic device 200 may store at least one first file associated with a first account in a first area of the memory 340, and store at least one second file associated with a second account in a second area 830 of the memory 340. For example, the electronic device 200 may store data, information, and/or a file in an area (e.g., the first area or the second area 830) of the memory 340 associated with a path (or address) corresponding to each of a host account and a guest account, based on performing an operation (e.g., an application-based operation) in an execution environment of the host account (e.g., the first account) or the guest account (e.g., the second account). Since the electronic device 200 may perform operation 701 in the same manner as operations 501 and 503 described before, a redundant description will be avoided.

According to various embodiments, the electronic device 200 may execute an application for managing a file stored in the memory 340 in operation 703. For example, as illustrated in FIG. 8A, the electronic device 200 may execute a file application based on reception of an input that selects an icon corresponding to the file application, displayed on a home screen. The file application may be implemented to provide an analysis function and a management function for the memory usage of each of accounts (e.g., a host account and a guest account corresponding to at least one of a dual messenger, a secure folder, or a work profile). The analysis function may include a function of classifying files stored for each account into categories. The management function may include at least one of a delete function, a save function, a move function, or a copy function for the files stored for each account. The analysis function and the management function for each account may be provided, when the file application is configured with an authority and/or function for analyzing the memory 340 for the account. When the authority and/or function for analyzing the memory 340 is not configured for a specific account, upon completion of authentication of the specific account, the analysis function and the management function for the specific function based on the file application may be provided.

According to various embodiments, the file application may be configured to use (or have) the authority and/or function according to the type of a guest account or whether the guest account has been authenticated, as described before. In an embodiment, in the case of a specific account of a high security type, when authentication is not performed for the specific account, the file application may be configured not to have either of the afore-described memory usage request authority and/or function or the afore-described memory management authority and/or function, whereas when authentication is performed for the specific account, the file application may be configured to have the memory usage request authority and/or function and the memory management authority and/or function. Because the configuration state of the authority and/or function for the file application may be implemented as the afore-described configuration state of the authority and/or function for the host account, a redundant description will be avoided. As described above, according to various embodiments, the operation of the electronic device 200 may be performed based on another application (e.g., the gallery application) configured to use the authority and/or function (e.g., API) for identifying the usage of the memory 340 for each account (e.g., the host account and the guest account) in addition to the file application, as descried before.

According to various embodiments, the electronic device 200 may identify a first memory usage of the memory 340 associated with the first account and a second memory usage of the second area 830 of the memory 340 associated with the second account based on the executed application in operation 705. For example, the electronic device 200 may identify the usage of data, information, and/or a file stored in the first area of the memory 340 corresponding to the host account and the usage of data, information, and/or a file stored in the second area 830 of the memory 340 corresponding to the guest account, based on the file application. Since the electronic device 200 may perform operation 705 in the same manner as operations 507 and 509 described before, a redundant description will be avoided.

According to various embodiments, in operation 707, the electronic device 200 may display a first execution screen of the application, including first information about the difference between the first memory usage and the second memory usage, and second information about the second memory usage. For example, as illustrated in 801 of FIG. 8A, the electronic device 200 may display an execution screen (e.g., a first execution screen 811) of the file application, including information 810*a* about the first memory usage of the host account (e.g., the first account) and the second memory usage of the guest account (e.g., the second account). Since the electronic device may perform operation 707 in the same manner as operation 511 described above, a redundant description will be avoided.

According to various embodiments, the electronic device 200 may determine whether a first input for an analysis associated with the second area 830 of the memory 340 has been received in operation 709, and upon receipt of the first input, display a second execution screen of the application, including information about a memory usage per category of the at least one second file in operation 711. For example, as illustrated in 801 of FIG. 8A, the electronic device 200 may receive a user input (e.g., the first input) for selecting an object 812 (e.g., a graphic user interface (GUI) element) configured to provide the analysis function, displayed on an execution screen (e.g., the first execution screen 811) of the file application, including the information 810*a* and 810*b* about the memory usages (e.g., the first memory usage and the second memory usage). While the object 812 (or icon) may be displayed at a bottom of the home screen as illustrated, an object configured to provide the analysis function may be implemented in an area indicating the memory usage of each specific account (e.g., each of the first account and the second account) or in a menu window such as a pop-up type or a drop-down type, not limited to the illustration. As illustrated in 802 of FIG. 8A, the electronic device 200 may display a second execution screen 821 of the file application, including information about memory usages per category (or type) of files in each account, based on receiving the user input (e.g., the first input). Based on a user input 820 (e.g., a swipe input or a drag input) on the second execution screen 821, the electronic device 200 may display an execution screen including information about memory usages per category (or type) of each account. For example, referring to 802 of FIG. 8A, the electronic device 200 may display an execution screen (e.g., a second execution screen) of the file application, including information about memory usages per category of files associated with the guest account (e.g., the second account). Referring to 802 of FIG. 8A, categories may include Media 822, Apps 823, Other 824, and Trash 825. Files of the Media category 822 may include an image file (Images), a video file (Videos), an audio file (Audio), a document file (Documents), an installation file (Installation files), and a compressed file (Compressed), which are associated with the guest account (e.g., the second account). Files of the Apps category 823 may include an application associated with the guest account of the electronic device 200. Files of the Trash category 825 may include files deleted by the user among files obtained by the guest account (e.g., the second account). Files of the Other category 824 may include files of types which are not included in the above categories.

According to various embodiments, the electronic device 200 may display an execution screen (e.g., the second execution screen 821) of the file application, including information about memory usages per category of files associated with the guest account, based on at least one of lower paths 832, 833, and 834 of the files associated with the guest account (e.g., the second account) or information (e.g., information about an extension and a media type) about each of the files. For example, in the state in which the electronic device 200 is set to the host account (or the main account), the electronic device 200 may identify the memory usage of each of the categories 822, 823, 824, and 825 based on the lower paths 832, 833, and 834 of the files associated with the guest account (e.g., the second account), and identify memory usages per type of the files included in the categories 822, 823, 824, and 825 based on the information (e.g., the information about the extension and the media type) about each of the files, based on the file application. In an embodiment, the electronic device 200 may identify the capacity of stored files in each of the lower paths 832, 833, and 834 of a path (or higher path) 831 (e.g., "storage/ emulated/guest account identifier (userId)") assigned to the guest account, based on the file application, and identify the identified capacity of the files in each of the lower paths 832, 833, and 834 as the usage of a category corresponding to the lower path. For example, referring to FIG. 8A, files of the Media category and files of the Other category may be stored in the first lower path 832 (e.g., "storage/emulated/guest account identifier (userId)/sharedarea/ . . . ") of the higher path 831 (e.g., "storage/emulated/guest account identifier (userId)"), files of the Apps category may be stored in the second lower path 833 (e.g., "storage/emulated/guest account identifier (userId)/Android/data/ . . . "), and files of the Trash category may be stored in the third lower path 834 (e.g., "storage/emulated/identifier (userId)/Android/ Trash/ . . . "). However, files of a different category may be stored in each path, not limited to the description and/or the illustration. As described above, when the electronic device 200 identifies the capacities of files corresponding to the specific lower paths 832, 833, and 834 according to the types of categories (e.g., the Media category, the Apps category, and the Trash category) set for the lower paths 832, 833, and 834, respectively, the electronic device 200 may identify the identified capacities of the files as usages corresponding to the specific lower paths 832, 833, and 834, respectively. The electronic device 200 may identify a category corresponding to information (e.g., information about an extension or a media type) about each of files associated with the guest account based on identifying the information about the file based on the file application, and identify the identified capacity of each of the files associated with the guest account as the usage of the identified category of the file. Further, in an embodiment, based on identifying information (e.g., information about extensions or media types) about files identified for each of the lower paths 832, 833, and 834 based on the file application, the electronic device 200 may identify information about memory usages per type of the files of the categories corresponding to the lower paths 832, 833, and 834. For example, based on identifying information about the extension and/or media type of fields included in the first lower path 832 corresponding to the Media category 822 from preconfigured information (e.g., a media store database), the electronic device 200 may identify a type (e.g., images, video, audio, documents, installation files, or compressed files) corresponding to the extension and/or media type of the files, and identify the capacity of the files as a memory usage corresponding to the identified type. For example, when the media type of first files stored in the first lower path is images, the electronic device 200 may identify the capacity of the first files as the usage of files of the images type.

According to various embodiments, the afore-described analysis function of the electronic device 200 may be performed based on the memory usage request authority (or function) and/or the memory management authority (or function) for the guest account. The file application may be configured to, in the state where the account of the electronic device 200 is set to the host account, have an authority and/or function for obtaining a memory usage (e.g., the afore-described memory usage request authority) for file storage paths (e.g., the afore-described higher path and lower paths) corresponding to the guest account, for the analysis. The authority and/or function (e.g., the afore-described memory usage request authority) may be an authority or function supported by a specific version (e.g., version 12) (or S OS) of Android OS.

While the operation of analyzing files of an account corresponding to a dual messenger is shown in FIG. 8A by way of example, the analysis function may be performed for various types of guest accounts (e.g., a secure folder, a cloud storage, a work profile, and so on), not limited to the illustration, and a redundant description will be avoided.

According to various embodiments, the electronic device 200 may determine whether a second input for managing at least one second file has been received in operation 713. Upon receipt of the second input, the electronic device 200 may display a third execution screen of the application for managing at least one second file in operation 715. For example, as illustrated in 803 of FIG. 8B, the electronic device 200 may receive a user input (e.g., the second input) for selecting a specific area 840 (or a specific object) from among areas (or objects) including information about the usage of the memory 340 for each account, on the execution screen (e.g., the first execution screen 811) including the information 810*a* and 810*b* about the memory usages (e.g., the first memory usage and second memory usage) of the file application. As illustrated in 804 of FIG. 8B, based on the reception of the user input (e.g., the second input), the electronic device 200 may display an execution screen (e.g., a third execution screen) of the file application for providing a management function of files related to a guest account (e.g., the second account) corresponding to the specific area 840 of FIG. 8B. For example, the execution screen (e.g., the third execution screen) of the file application may display a menu screen 842 including objects configured to provide functions of managing files 841 associated with an account corresponding to the selected object, along with the files 841. Each of the objects may be implemented to provide a move function, a copy function, a share function, or a delete function, and to provide various kinds of management functions associated with a file, such as a change name function, not limited to the illustration and/or the description. Although the menu screen 842 implemented to provide management functions without user authentication may be provided for a guest account of the low security type (e.g., a guest account corresponding to a dual messenger), user authentication may be required for a guest account of the high security type (e.g., a secure folder or a work profile).

According to various embodiments, the electronic device 200 may provide a management function for the files, using the file application executed based on the host account, based on the memory management authority and/or function for a guest account configured for the file application. When the memory management authority and/or function for the guest account is not configured for the file application, authentication needs to be performed for the guest account. An example of authentication of the guest account will be described later with reference to FIGS. 12 to 13C.

An exemplary operation of the electronic device 200 according to various embodiments will be described below.

According to various embodiments, the electronic device 200 (e.g., the processor 330) may display an execution screen of a file application, including information about the usage of each account (e.g., a host account and a guest account corresponding to at least one of a dual messenger, a secure folder, or a work profile) relative to the total usage of the internal memory 340. The file application may be implemented to provide an analysis function for each of the accounts (e.g., the host account and the guest account corresponding to the at least one of the dual messenger, the secure folder, or the work profile). As described above, the analysis function may include a function of classifying files stored in each account into categories. The file application may be implemented to provide the analysis function through various types of user interfaces (UIs) for a guest account with high security (e.g., a secure folder or a work profile) among guest accounts. The high security may mean that user authentication is required for a management function, as described before.

FIG. 9 is a flowchart 900 illustrating an exemplary operation of the electronic device 200 according to various embodiments. According to various embodiments, the operations illustrated in FIG. 9 may be performed in various orders, not limited to the illustrated order. According to various embodiments, more operations than those illustrated in FIG. 9 or at least one operation fewer than those illustrated in FIG. 9 may be performed. FIG. 9 will be described with reference to FIGS. 10A, 10B, and 11.

Figure 10A:
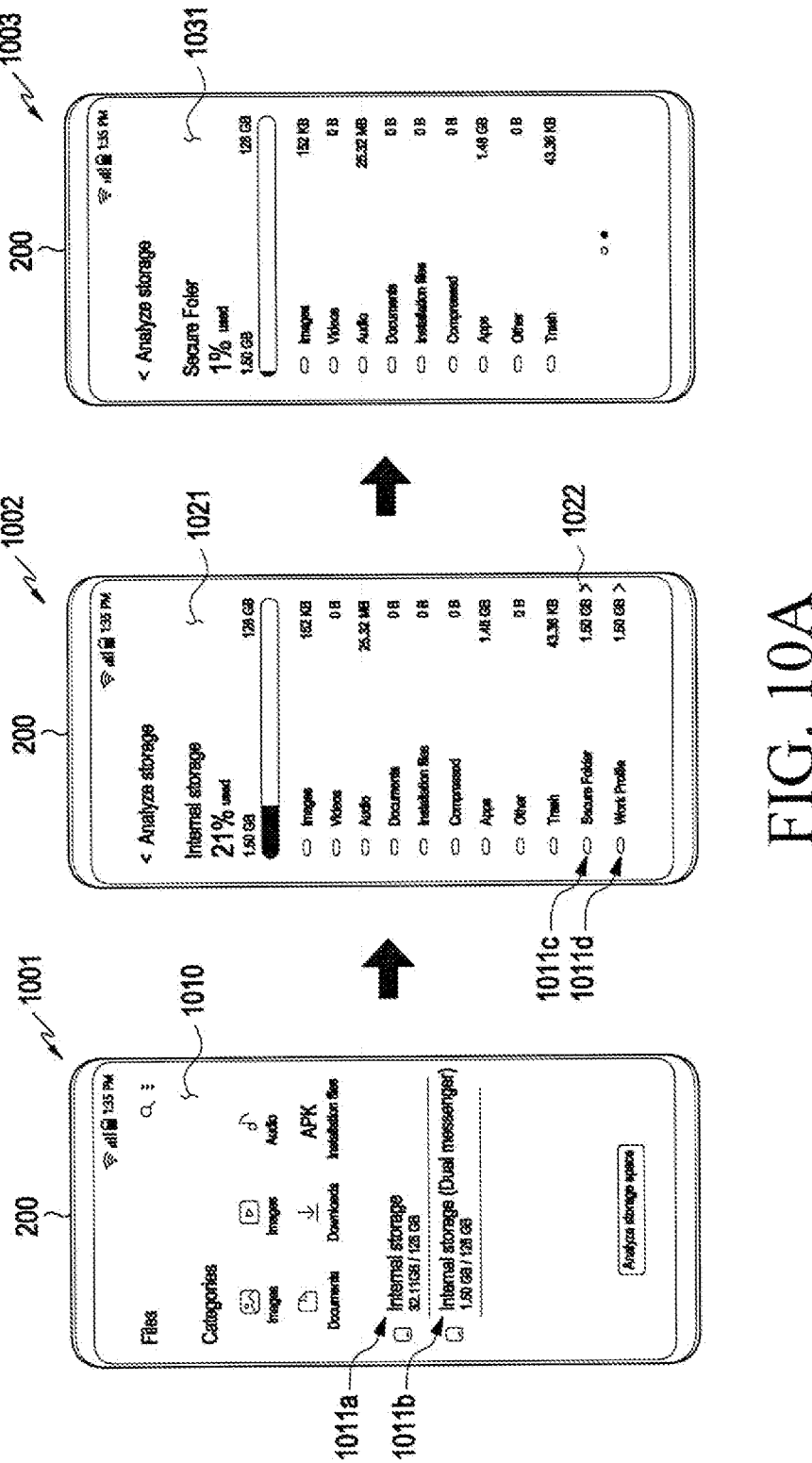
FIG. 10A is a diagram illustrating an exemplary screen providing information about the memory usage of each guest account in an electronic device 200 according to various embodiments.
Figure 10B:
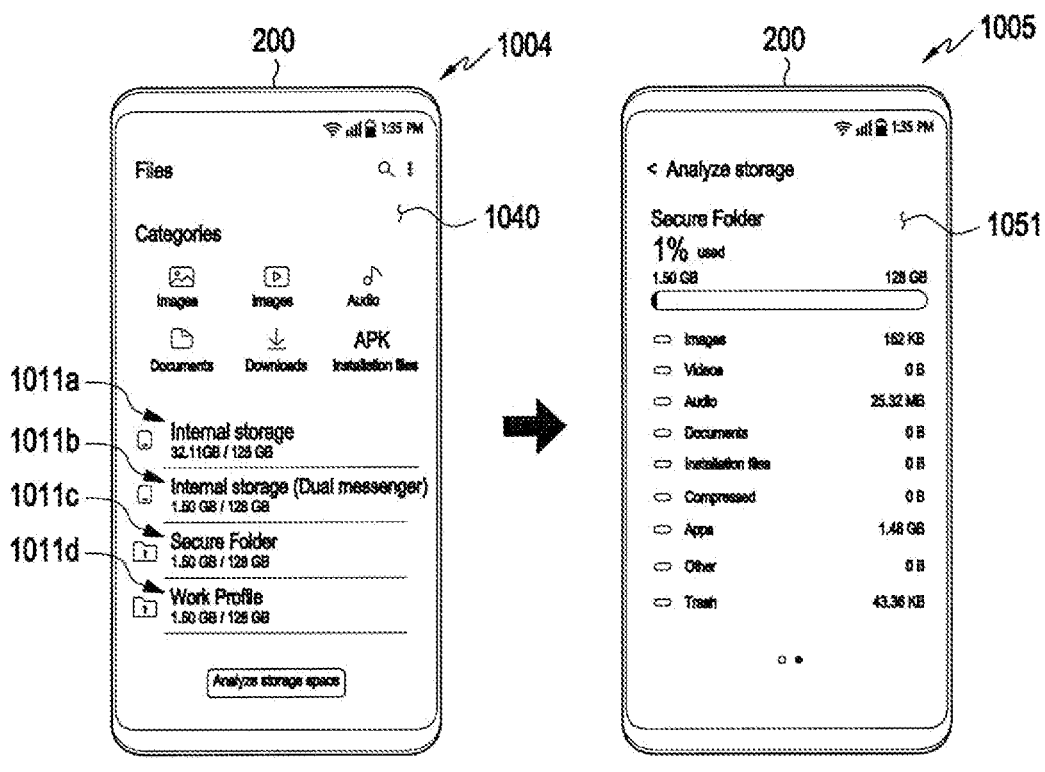
FIG. 10B is a diagram illustrating an exemplary screen providing information about the memory usage of each guest account in the electronic device 200 according to various embodiments.
Figure 10C:
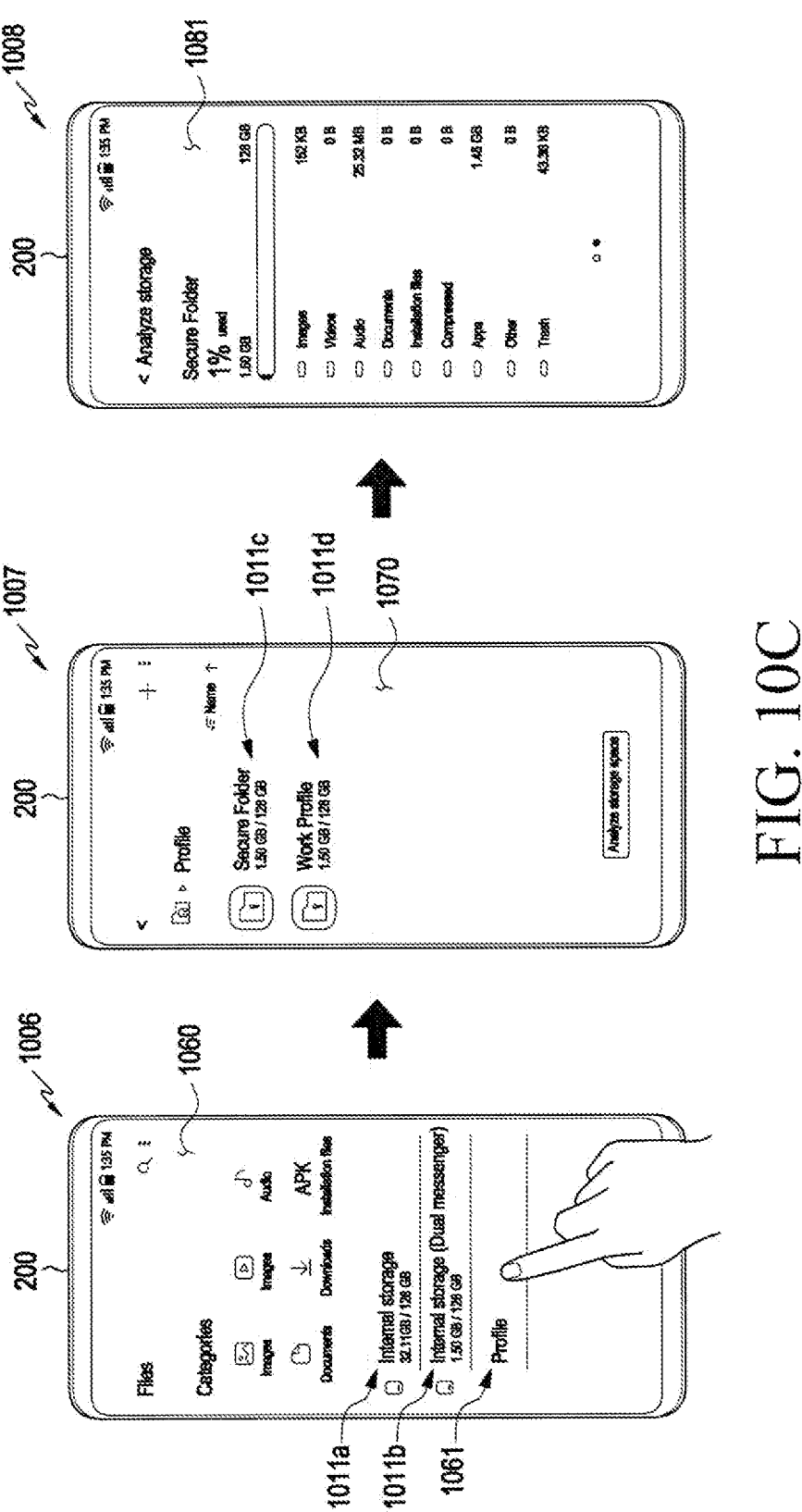
FIG. 10C is a diagram illustrating an exemplary screen providing information about the memory usage of each guest account in the electronic device 200 according to various embodiments.
Figure 11:
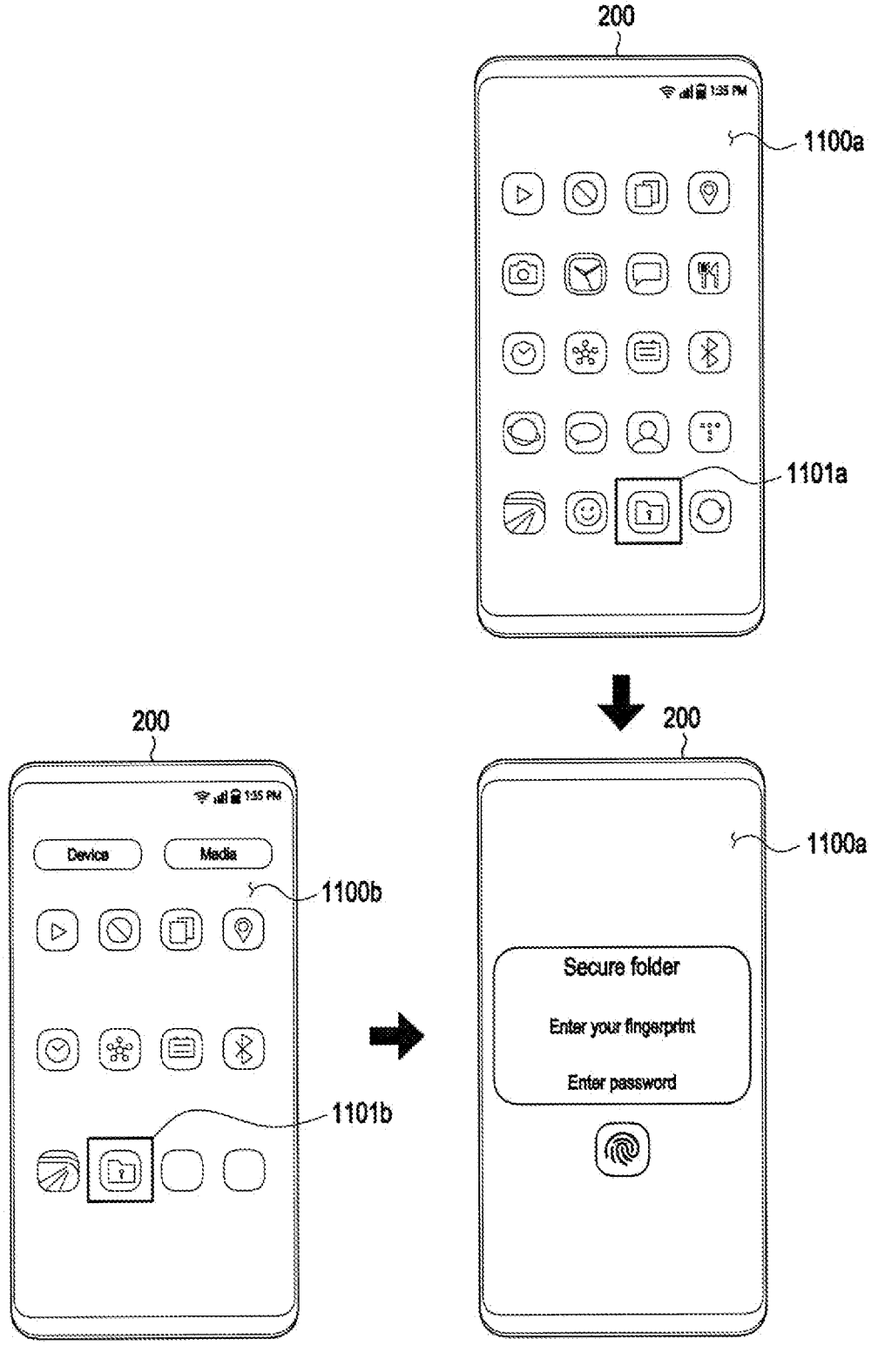
FIG. 11 is a diagram illustrating an exemplary operation of authenticating a guest account according to various embodiments.

FIG. 10A is a diagram illustrating an exemplary screen that provides information about the memory usage of each guest account in the electronic device 200 according to various embodiments. FIG. 10B is a diagram illustrating an exemplary screen that provides information about the memory usage of each guest account in the electronic device 200 according to various embodiments. FIG. 10C is a diagram illustrating an exemplary screen that provides information about the memory usage of each guest account in the electronic device 200 according to various embodiments. FIG. 11 is a diagram illustrating an exemplary authentication operation for a guest account according to various embodiments.

According to various embodiments, in operation 901, the electronic device 200 may store a file associated with each of a plurality of accounts in an area for the account in the memory 340. For example, the electronic device 200 may store data, information, and/or files obtained based on performing an operation (e.g., an application-based operation) in an execution environment of each of a host account and guest accounts (e.g., an account corresponding to a dual application, an account corresponding to a work profile, and an account corresponding to a secure folder) configured in the electronic device 200 in areas (e.g., a first area and a second area) of the memory 340, associated with paths (or addresses) corresponding to the host account and each of the guest accounts, respectively. Because the electronic device 200 may perform operation 901 in a similar manner to operations 501 and 503 described before, a redundant description will be avoided.

According to various embodiments, in operation 903, the electronic device 200 may execute an application for managing files stored in the memory 340. For example, as illustrated in FIG. 8A, the electronic device 200 may execute a file application based on receiving an input for selecting an icon corresponding to the afore-described file application displayed on a home screen. The file application may be implemented to provide an analysis function and a management function for the usage of each of the accounts (e.g., a host account and a guest account corresponding to at least one of a dual messenger, a secure folder, or a work profile). The analysis function may include a function of classifying files stored in each account into categories. The management function may include at least one of a delete function, a save function, a move function, or a copy function for the files stored in each account. Because the electronic device 200 may perform operation 903 in a similar manner to operation 703, a redundant description will be avoided.

According to various embodiments, in operation 905, the electronic device 200 may display the first execution screen 811 including information about the memory usage of each of a plurality of accounts based on the executed application. In an embodiment, as illustrated in 1001 of FIG. 10A, the electronic device 200 may display an execution screen 1010 of the file application, including information about memory usages corresponding to a host account 1011*a* and a guest account 1011*b* corresponding to a dual messenger. Upon selection of an object for providing the analysis function (e.g., an "analyze storage space" object) as described before, the electronic device 200 may display information about the memory usages of guest accounts corresponding to a secure folder 1011*c* and a work profile 1011*d* which are a high-security type, in addition to the dual messenger, on an execution screen 1021 including information about the memory usages per category of files for the host account 1011*a*, as illustrated in 1002 of FIG. 10A. High security may mean that user authentication is required for a management function, as described above. In an embodiment, as illustrated in 1004 of FIG. 10B, the electronic device 200 may display a home screen 1040 of the file application, including information about the memory usage of each account (e.g., a host account and guest accounts). The guest accounts may include the guest account 1011*b* corresponding to the dual messenger, the guest account corresponding to the secure folder 1011*c*, and the guest account 1011*d* corresponding to the work profile, as illustrated in 1004 of FIG. 10B, and may further include a guest account (not shown) corresponding to a user cloud storage, not limited to the description and/or the illustration. This has been described before with reference to FIG. 2, and thus a redundant description will be avoided. In an embodiment, as illustrated in 1006 of FIG. 10C, the electronic device 200 may display an execution screen 1060 of the file application, including information about the memory usage of the host account 1011*a* the memory usage of the guest account 1011*b* corresponding to the dual messenger, and a menu object 1061 implemented to provide the memory usage of each guest account of a high-security type other than the dual messenger. As illustrated in 1007 of FIG. 10C, when the menu object 1061 is selected, the electronic device 200 may display an execution screen 1070 of the file application, including information about the memory usages of the guest accounts of the high-security type (e.g., the secure folder 1011*c* and the work profile 1011*d*).

According to various embodiments, in operation 907, the electronic device 200 may display a second execution screen including information about the memory usage per category of files associated with each of the plurality of accounts. In an embodiment, as illustrated in 1002 and 1003 of FIG. 10A, upon selection of an object 1022 associated with a specific guest account (e.g., the specific guest account corresponding to the secure folder 1011*c*) on the execution screen 1021 including information about the memory usages per category of files for the host account, the electronic device 200 may display an execution screen 1031 (e.g., the second execution screen) including information about the memory usages per category of files in the specific guest account. In an embodiment, as illustrated in 1005 of FIG. 10B, upon selection of an object (e.g., the "analyze storage space" object") implemented to provide the analysis function for the storage spaces of the home screen of the file application, as described before with reference to FIG. 8A, the electronic device 200 may display an execution screen 1051 (e.g., the second execution screen) of the file application, including information about the memory usages per category of files in each account. Further, in an embodiment, upon selection of the object (e.g., the "storage space analysis" object) implemented to provide the analysis function for the storage spaces on the execution screen 1070 described with reference to 1007 of FIG. 10C, the electronic device 200 may display an execution screen 1081 of the file application, including information about the memory usages per category of each of the accounts 1011*c* and 1011*d*, as illustrated in 1008 of FIG. 10C. Because the operation of providing an analysis function in the electronic device 200 has been described with reference to FIG. 8A, a more detailed description thereof will be omitted.

According to various embodiments, authentication may be required for a selected account according to the type of the account, to provide a management function based on the file application. For example, in the case of a guest account of the high-security type (e.g., a work profile or a secure folder), the memory management authority (or function) may be required for the file application to provide the management function. When the authentication is performed, upon selection of an area indicating the memory usage of the guest account of the high-security type (e.g., the work profile or the secure folder) on the execution screen of the file application, the electronic device 200 may provide the file management function for the guest account corresponding to the selected area. For example, as illustrated in FIG. 11, authentication may be performed for a specific account of the high security type. The authentication of the specific account may include at least one of fingerprint-based authentication, pattern-based authentication, biometric information-based authentication, or password-based authentication, and may further include various other types of authentication schemes, not limited to the above authentication schemes. For example, in the case of an account corresponding to a secure folder, specific biometric information (e.g., a fingerprint, the iris, or the face) may be pre-registered in the electronic device 200, for authentication of the secure folder. In this case, upon selection of an icon 1101*a* corresponding to a secure folder displayed on a home screen 1100*a* or an icon 1101*b* for activating/deactivating the function of the secure folder displayed on a panel 1100*b*, the electronic device 200 may provide a screen 1110 for inputting biometric information and determine whether the authentication is successful based on a comparison between the input biometric information and pre-stored biometric information. When the input biometric information matches the pre-stored biometric information, the electronic device 200 may identify that the authentication is successful, and configure the file application with the memory management authority (or function) for the account corresponding to the secure folder based on the identification of the authentication as successful. While the account for the secure folder has been described as an example, the foregoing description may be applied adaptively to a description of other guest accounts.

An exemplary operation of the electronic device 200 according to various embodiments will be described below.

According to various embodiments, the electronic device 200 (e.g., the processor 330) may provide a GUI for performing authentication for accounts (e.g., the afore-described accounts of the high-security type) requiring authentication for a management function, based on an application (e.g., a file application) implemented to manage files on an account basis.

Figure 12:
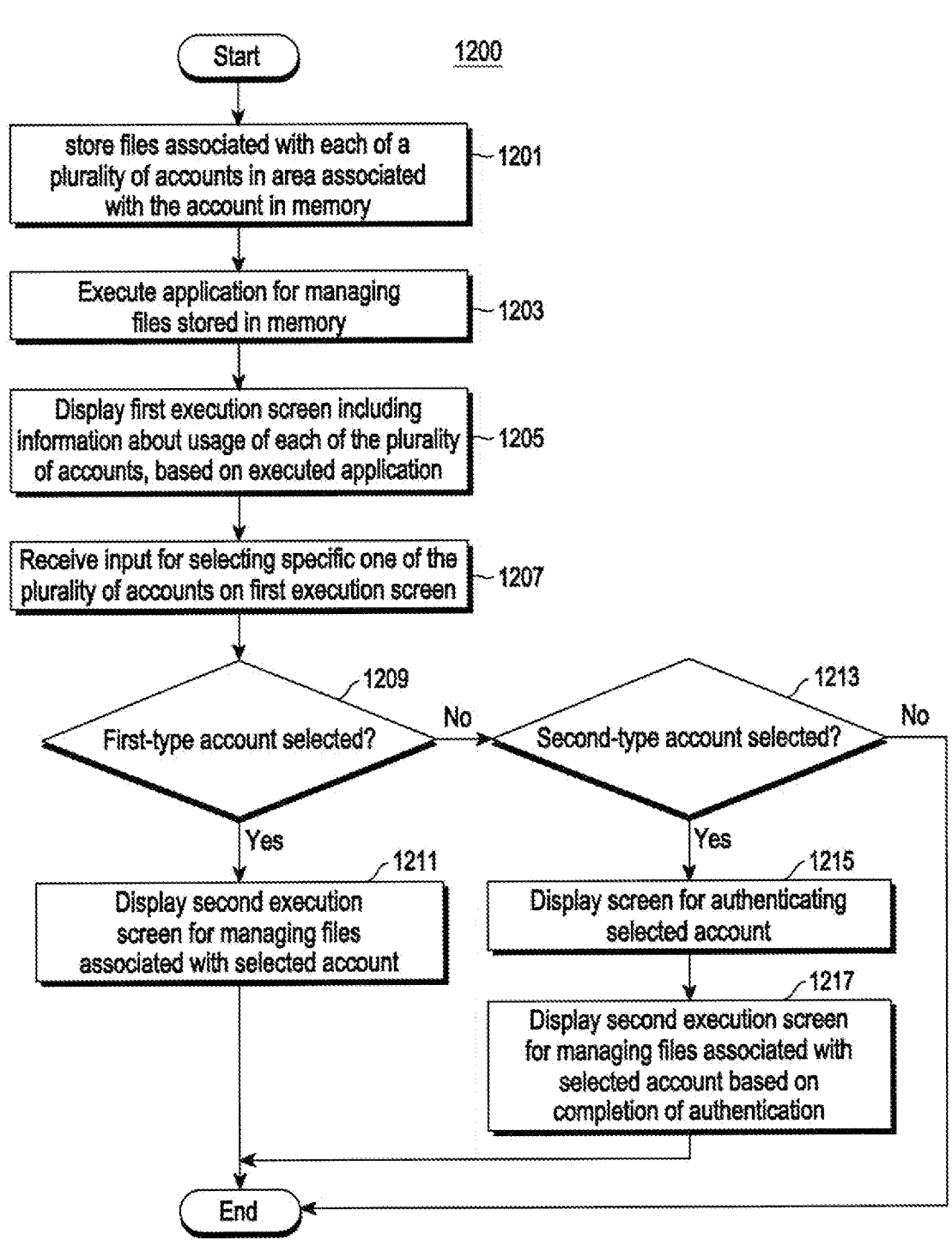
FIG. 12 is a flowchart illustrating an exemplary operation of an electronic device according to various embodiments.

FIG. 12 is a flowchart 1200 illustrating an exemplary operation of the electronic device 200 according to various embodiments. According to various embodiments, the operations illustrated in FIG. 12 may be performed in various orders, not limited to the illustrated order. According to various embodiments, more operations than those illustrated in FIG. 12 or at least one operation fewer than those illustrated in FIG. 12 may be performed. FIG. 12 will be described with reference to FIGS. 13A and 13B.

Figure 13A:
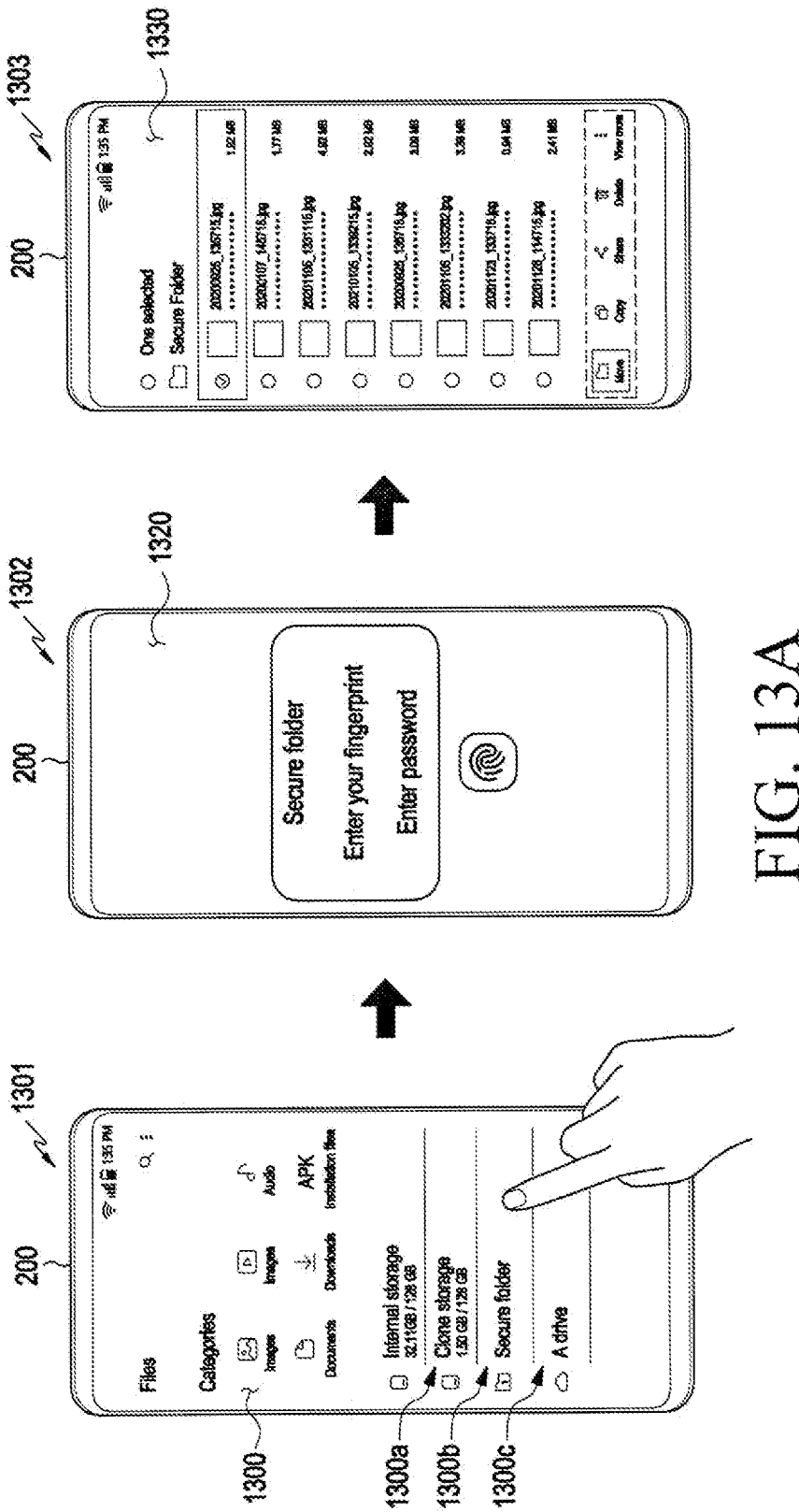
FIG. 13A is a diagram illustrating an exemplary account authentication operation based on a file application in an electronic device according to various embodiments.
Figure 13B:
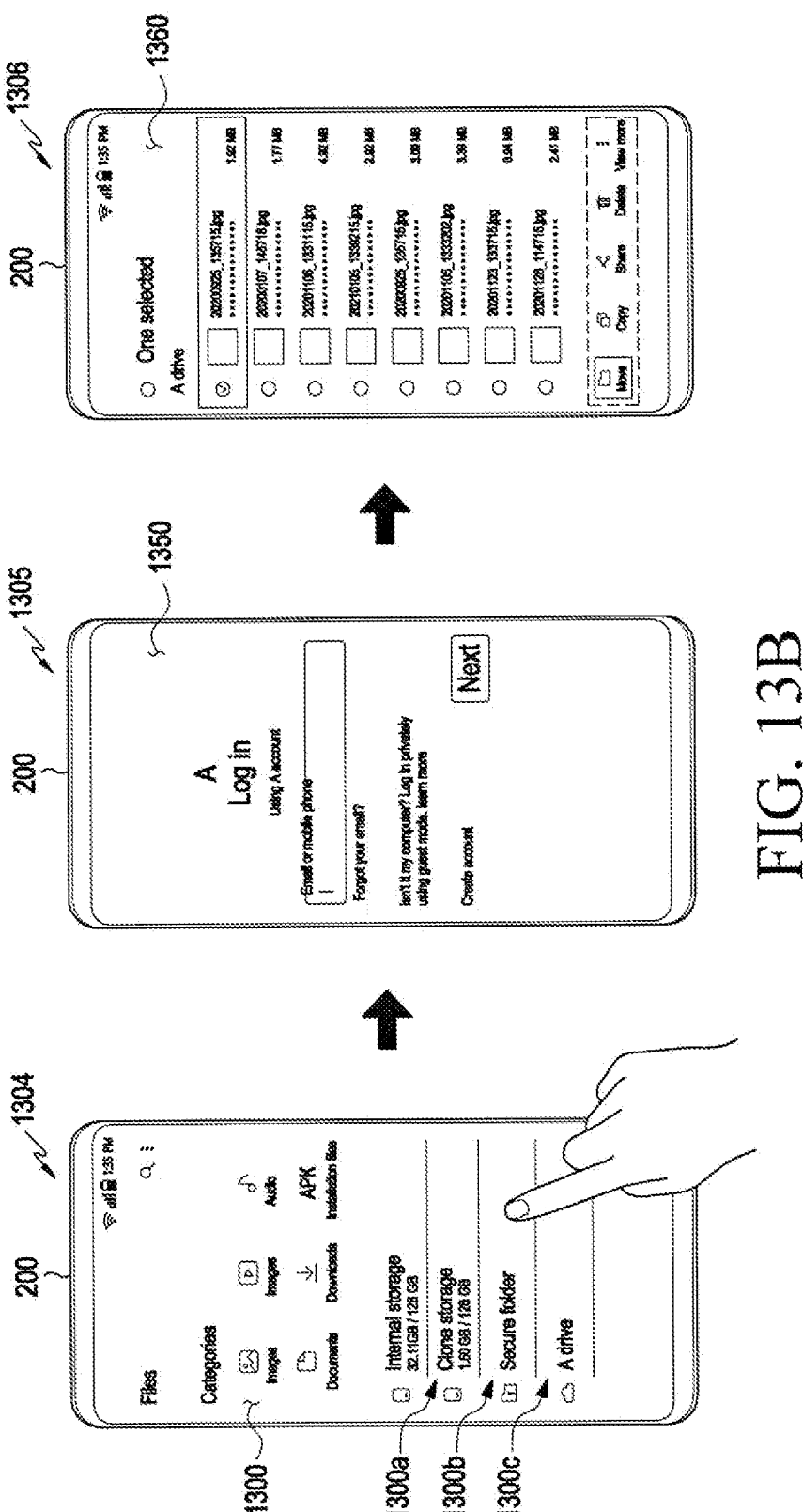
FIG. 13B is a diagram illustrating an exemplary account authentication operation based on a file application in an electronic device according to various embodiments.
Figure 13C:
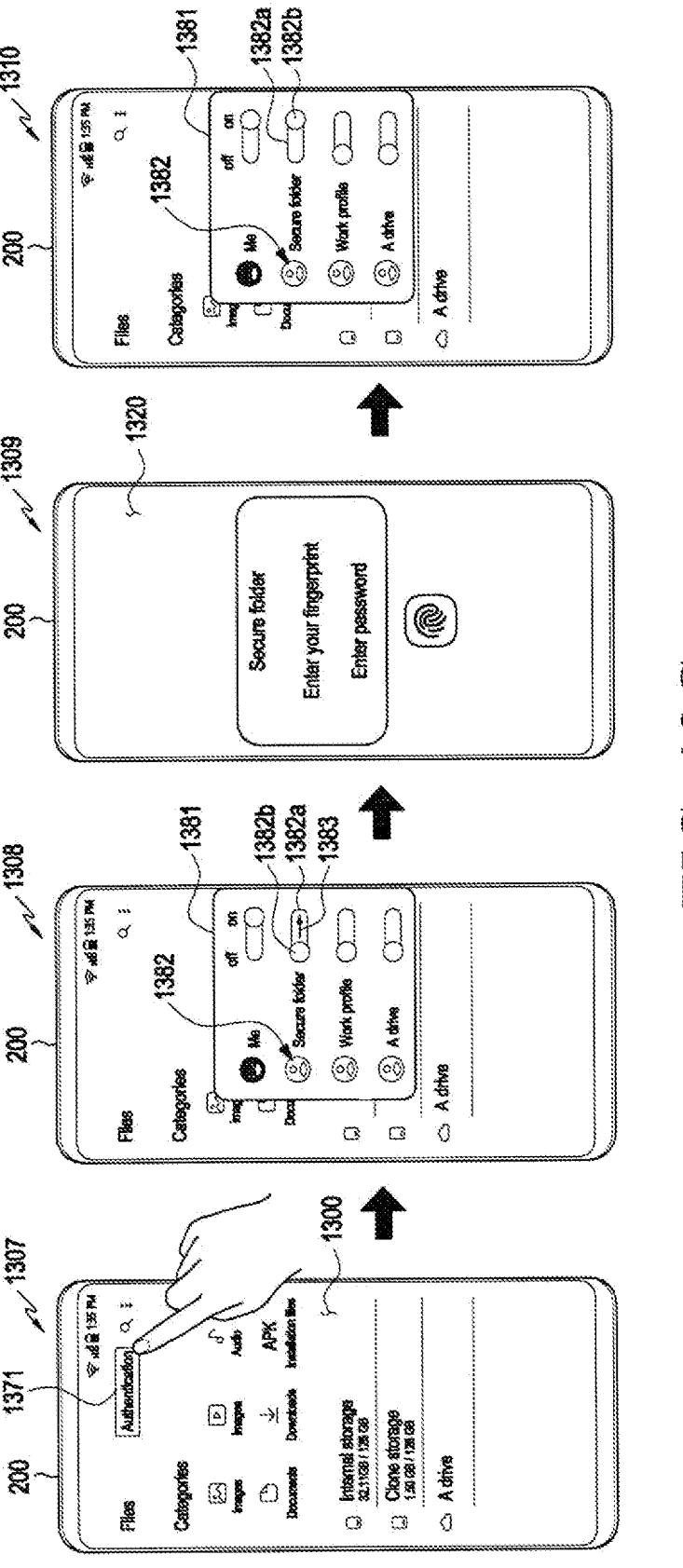
FIG. 13C is a diagram illustrating an exemplary account authentication operation based on a file application in an electronic device according to various embodiments.

FIG. 13A is a diagram illustrating an exemplary account authentication operation based on a file application in the electronic device 200 according to various embodiments. FIG. 13B is a diagram illustrating an exemplary account authentication operation based on a file application in the electronic device 200 according to various embodiments. FIG. 13C is a diagram illustrating an exemplary account authentication operation based on a file application in the electronic device 200 according to various embodiments.

According to various embodiments, in operation 1201, the electronic device 200 may store a file associated with each of a plurality of accounts in an area (e.g., partition) for the account in the memory 340. For example, the electronic device 200 may store data, information, and/or files obtained based on performing an operation (e.g., an application-based operation) in an execution environment of each of a host account and guest accounts (e.g., an account corresponding to a dual application, an account corresponding to a work profile, and an account corresponding to a secure folder) configured in the electronic device 200 in areas (e.g., a first area and a second area) of the memory 340, associated with paths (or addresses) corresponding to the host account and each of the guest accounts, respectively. Because the electronic device 200 may perform operation 1201 in a similar manner to operations 501 and 503 described before, a redundant description will be avoided.

According to various embodiments, in operation 1203, the electronic device 200 may execute an application for managing files stored in the memory 340. For example, as illustrated in FIG. 13A the electronic device 200 may execute the afore-described file application based on receiving an input for selecting an icon corresponding to the file application displayed on a home screen. The file application may be implemented to provide an analysis function and a management function for the memory usage of each of the accounts (e.g., a host account and a guest account corresponding to at least one of a dual messenger, a secure folder, or a work profile). The analysis function may include a function of classifying files stored in each account into categories. The management function may include at least one of a delete function, a save function, a move function, or a copy function for the files stored in each account. Because the electronic device 200 may perform operation 1203 in the same manner as operation 703 described before, a redundant description will be avoided.

According to various embodiments, in operation 1205, the electronic device 200 may display the first execution screen 811 including information about the memory usage of each of the plurality of accounts, based on the executed application. For example, the electronic device 200 may display an execution screen of the file application, including information about the memory usage of each account (e.g., the host account and the guest account corresponding to the at least one of the dual messenger, the secure folder, or the work profile). In an embodiment, as illustrated in 1301 and 1304 of FIGS. 13A and 13B, the electronic device 200 may display a home screen 1300 of the file application, including information 1300a, 1300b, and 1300c about the memory usages of the respective accounts (e.g., the host account and the guest account corresponding to the at least one of the dual messenger, the secure folder, or the work profile). In an embodiment, while not shown, upon selection of a menu object implemented to provide information about the memory usage of each guest account on the execution screen of the file application as described before with reference to FIG. 10A, the electronic device 200 may display the execution screen of the file application, including information about the memory usage of each account (e.g., the guest account corresponding to the at least one of the dual messenger, the secure folder, or the work profile). Because the electronic device 200 may perform operation 1205 in the same manner as operation 905 described before, a redundant description will be avoided.

According to various embodiments, in operation 1207, the electronic device 200 may receive an input for selecting a specific account from among the plurality of accounts on the first execution screen 811. For example, as illustrated in 1301 and 1304 of FIG. 13A, the electronic device 200 may receive a user input for selecting the object 1300b or 1300c including information about the memory usage of a specific guest account (e.g., a secure folder or a cloud storage) from among the plurality of accounts.

According to various embodiments, the electronic device 200 may determine whether the selected account is an account of a first type in operation 1209. When the account is the first type, the electronic device 200 may display a second execution screen 1330 or 1360 for managing files associated with the selected account in operation 1211. For example, when the selected account is an account of a low security type (e.g., the first type), the electronic device 200 may display the second execution screen 1330 or 1360 implemented to provide the function of managing the files associated with the selected account without an authentication operation. The account of the low security type may include an account corresponding to a dual application (e.g., a dual messenger application).

According to various embodiments, when the selected account is not an account of the first type, the electronic device 200 may determine whether the selected account is an account of a second type in operation 1213. When the account is the second type, the electronic device 200 may display a screen for authentication of the selected account in operation 1215, and display the second execution screen 1330 or 1360 for managing the files associated with the selected account based on completion of the authentication in operation 1217. For example, when the selected account is an account of a high security type (e.g., the second type), the electronic device 200 may display a screen for authentication of the selected account based on the file application. For example, as illustrated in 1302 of FIG. 13A, the electronic device 200 may provide (or display) a screen 1320 for fingerprint authentication of the selected account (e.g., an account corresponding to a secure folder). Further, for example, as illustrated in 1305 of FIG. 13B, the electronic device 200 may provide (or display) a screen 1350 for logging in to (e.g., for receiving an ID and a password of) the selected account (e.g., an account corresponding to a cloud storage). When the authentication is completed (e.g., information is matched) based on the result of a comparison between information (e.g., the user fingerprint or the user ID/password) received based on the provided screen and pre-stored information (e.g., a pre-stored fingerprint or a pre-stored ID/password), the electronic device 200 may display the second execution screen 1330 or 1360 implemented to provide the function of managing the files associated with the selected account (e.g., the account corresponding to the secure folder or the account corresponding to the cloud storage), as illustrated in 1303 and 1306 of FIGS. 13A and 13B. The second execution screens 1330 and 1360 implemented to provide the management function have been described before in detail with reference to FIG. 8B, a redundant description will be avoided.

According to various embodiments, the file application may be implemented to provide an authentication function for accounts regardless of a user input for selecting an account. For example, referring to 1307 of FIG. 13C, the home screen 1300 of the file application may include an authentication object 1371 implemented to provide the authentication function. upon selection of the authentication object 1371 on the home screen 1300 of the file application, the electronic device 200 may display a screen 1381 for authenticating each of accounts that require authentication (e.g., the secure folder, the work profile, and the cloud storage). The screen 1381 may be displayed in the form of a pop-up screen as illustrated. However, the screen 1381 may be displayed in the form of a full screen, not limited to the pop-up screen. The screen 1381 may include an object (e.g., a bar) 1382a and a button (or an indicator) 1382b indicating an active or inactive state (e.g., on or off) of each account. Upon receipt of an input for activating a specific account (e.g., an input that moves the button 1382*b* to a position indicating activation (on) of the specific account) according to the control of the object (e.g., bar) 1382*a* and the button (or indicator) 1382*b*, the electronic device 200 may display a screen 1390 for authentication of the specific account, as illustrated in 1309 of FIG. 13C. When the authentication is successfully completed, the electronic device 200 may update the screen to indicate that the specific account has been activated (e.g., display the button 1382*b* at a position of the bar 1382*a* indicating on of the specific account), as indicated in 1310 of FIG. 13C, and upon selection of a specific account from among the plurality of accounts, display the second execution screen 1330 or 1360 implemented to provide the management function as described before.

According to various embodiments, an electronic device (e.g., the electronic device 200 of FIG. 2) may include a display (e.g., the display 321 of FIG. 3), a memory (e.g., the memory 340 of FIG. 3), and at least one processor (e.g., the processor 330 of FIG. 3). The at least one processor (e.g., the processor 330 of FIG. 3) may be configured to identify a first account and a second account associated with a user of the electronic device (e.g., the electronic device 200 of FIG. 2), store at least one first file associated with the first account in a first area of the memory (e.g., the memory 340 of FIG. 3), store at least one second file associated with the second account in a second area of the memory (e.g., the memory 340 of FIG. 3), identify a first memory usage of the first area of the memory (e.g., the memory 340 of FIG. 3) associated with the first account, based on the first account, identify a second memory usage of the second area of the memory (e.g., the memory 340 of FIG. 3) associated with the second account, based on the first account, and display a first execution screen including first information about the first memory usage and second information about the second memory usage on the display (e.g., the display 321 of FIG. 3).

According to various embodiments, the at least one processor (e.g., the processor 330 of FIG. 3) may be configured to execute a first application based on the first account, wherein the first application may be configured to be enabled to use at least one of an authority or a function for identifying the first memory usage associated with the first account and at least one of an authority or a function for identifying the second memory usage associated with the second account, identify the first memory usage and the second memory usage, based on the first application executed based on the first account, and display the first execution screen of the first application, including the first information about the first memory usage and the second information about the second memory usage.

According to various embodiments, the first execution screen of the first application may include information about the first memory usage relative to a total capacity of the memory (e.g., the memory 340 of FIG. 3), and information about the second memory usage relative to the total capacity of the memory (e.g., the memory 340 of FIG. 3).

According to various embodiments, the first application may include a file application configured to manage a file stored in the electronic device (e.g., the electronic device 200 of FIG. 2).

According to various embodiments, the first account may be a host account, and the second account may be a guest account. The at least one processor (e.g., the processor 330 of FIG. 3) may be configured to identify a first path for storing a file corresponding to the first account, identify a second path for storing a file corresponding to the second account, store the at least one first file in the first area corresponding to the first path, and store the at least one second file in the second area corresponding to the second path.

According to various embodiments, the at least one processor (e.g., the processor 330 of FIG. 3) may be configured to identify a total usage of the memory (e.g., the memory 340 of FIG. 3) and the second memory usage associated with the second account being the guest account, based on the first application, and identify the first memory usage based on a difference between the total usage and the second memory usage.

According to various embodiments, the authority or the function for identifying the second memory usage associated with the second account may include an authority or a function for requesting information about the second memory usage and/or an authority or a function for accessing the second area corresponding to the identified second path.

According to various embodiments, the first execution screen may further include a first object configured to provide an analysis function for the second account, and the at least one processor (e.g., the processor 330 of FIG. 3) may be configured to, based on the first object being selected, display a second execution screen of the first application, including information about a usage for each of a plurality of categories of the at least one second file. The plurality of categories may include at least one of a media category, an application category, a trash category, or other category.

According to various embodiments, the at least one processor (e.g., the processor 330 of FIG. 3) may be configured to identify at least one of information about a lower path of the second path or information about a file of the second path, corresponding to each of the at least one second file. The information about the file may include at least one of a media type or an extension, and identify information about a usage for each of a plurality of categories based on the identified at least one of the information about the lower path or the information about the file.

According to various embodiments, the first execution screen may further include a second object including information about the second memory usage, wherein the second object is configured to, when selected, provide a management function for a file of the second account, and the management function includes at least one of move, copy, delete, or change name for the file. The at least one processor (e.g., the processor 330 of FIG. 2) may be configured to, based on the second object being selected, display a third execution screen of the first application, including the at least one second file and a plurality of objects configured to provide the management function for the at least one second file.

According to various embodiments, the at least one processor (e.g., the processor 330 of FIG. 3) may be configured to, based on the second object being selected, identify a type of the second account corresponding to the second object, based on the type of the second account corresponding to an account of a specific type, display a screen for authentication of the second account, and when the authentication of the second account is completed based on the display of the screen, display the third execution screen of the first application.

According to various embodiments, the account of the specific type may include at least one of an account corresponding to a secure folder, an account corresponding to a work profile, or an account corresponding to a cloud storage.

According to various embodiments, the at least one processor (e.g., the processor 330 of FIG. 3) may be configured to, based on the authentication of the second account being completed, configure the first application with an authority or a function for reading from/writing to the second area of the memory (e.g., the memory 340 of FIG. 3) corresponding to the second account.

According to various embodiments, a method of operating an electronic device (e.g., the electronic device 200 of FIG. 2) may include identifying a first account and a second account associated with a user of the electronic device (e.g., the electronic device 200 of FIG. 2), storing at least one first file associated with the first account in a first area of a memory (e.g., the memory 340 of FIG. 3), storing at least one second file associated with the second account in a second area of the memory (e.g., the memory 340 of FIG. 3), identifying a first memory usage of the first area of the memory (e.g., the memory 340 of FIG. 3) associated with the first account, based on the first account, identifying a second memory usage of the second area of the memory (e.g., the memory 340 of FIG. 3) associated with the second account, based on the first account, and displaying a first execution screen including first information about the first memory usage and second information about the second memory usage on a display (e.g., the display 321 of FIG. 3).

According to various embodiments, the method may include executing a first application based on the first account, wherein the first application may be configured to be capable of using at least one of an authority or a function for identifying the first memory usage associated with the first account and at least one of an authority or a function for identifying the second memory usage associated with the second account, identifying the first memory usage and the second memory usage, based on the first application, and displaying the first execution screen of the first application, including the first information about the first memory usage and the second information about the second memory usage.

According to various embodiments, the first execution screen of the first application may include information about the first memory usage relative to a total capacity of the memory (e.g., the memory 340 of FIG. 3), and information about the second memory usage relative to the total capacity of the memory (e.g., the memory 340 of FIG. 3).

According to various embodiments, the first application may include a file application configured to manage a file stored in the electronic device (e.g., the electronic device 200 of FIG. 2).

According to various embodiments, the first account may be a host account, and the second account may be a guest account. The method may include identifying a first path for storing a file corresponding to the first account, identifying a second path for storing a file corresponding to the second account, storing the at least one first file in the first area corresponding to the first path, and storing the at least one second file in the second area corresponding to the second path.

According to various embodiments, the method may include identifying a total usage of the memory (e.g., the memory 340 of FIG. 3) and the second memory usage associated with the second account being the guest account, based on the first application, and identifying the first memory usage based on a difference between the total usage and the second memory usage.

According to various embodiments, an electronic device (e.g., the electronic device 200 of FIG. 2) may include a display (e.g., the display 321 of FIG. 3), a memory (e.g., the memory 340 of FIG. 3), and at least one processor (e.g., the processor 330 of FIG. 3). The at least one processor (e.g., the processor 330 of FIG. 3) may be configured to identify a first account and a second account associated with a user of the electronic device (e.g., the electronic device 200 of FIG. 2), store at least one first file associated with the first account in a first area of the memory (e.g., the memory 340 of FIG. 3), store at least one second file associated with the second account in a second area of the memory (e.g., the memory 340 of FIG. 3), execute a first application based on the first account, identify a first memory usage of the first area of the memory (e.g., the memory 340 of FIG. 3) associated with the first account, based on the first application executed based on the first account, identify a second memory usage of the second area of the memory (e.g., the memory 340 of FIG. 3) associated with the second account, based on the first application executed based on the first account, display a first execution screen of the first application, including a first object including first information about the first memory usage and a second object including second information about the second memory usage on the display (e.g., the display 321 of FIG. 3), and based on the second object being selected between the first object and the second object, display the first execution screen of the first application including the at least one second file and a plurality of objects configured to provide a management function for the at least one second file. The management function may include at least one of move, copy, delete, or change name for a file.

What is claimed is:

1. An electronic device, comprising:
   a display;
   a memory storing instructions; and
   at least one processor,
   wherein the instructions, when executed by the at least one processor individually or collectively, cause the electronic device to:
   identify a first profile and a second profile of a user, both the first profile and second profile associated with an application of the electronic device;
   display on the display a home screen including a plurality of selectable icons representing executable applications, in which the application is represented by two separate icons,
   a first icon of which is selectable to execute a first instance of the application in an operating system of the electronic device in tandem with the first profile but not the second profile, and
   a second icon of which is selectable to execute a duplicate second instance of the application in the same operating system as the first instance, in tandem with the second profile but not the first profile;
   store at least one first file associated with the first profile in a first area of the memory by the application;
   store at least one second file associated with the second profile in a second area of the memory by the duplicate of the application;
   in response to execution of a file application, identify a first amount of memory usage for the first area of the memory and a second amount of memory usage for the second area of the memory used by the duplicate of the application;
   control the display to display a first execution screen including first information indicating the first amount of memory usage for the first area of the memory, second information indicating the second amount of memory usage by the duplicate of the application, and a first object configured to provide an analysis function for memory usage associated with the second profile; and in response to identifying a touch on the first object, control the display to display a second execution screen of the file application including information about amounts of memory usage for a plurality of categories of the second profile, wherein the plurality of categories comprise an image category, a video category, and a document category, and wherein the information about the amounts of memory usage for the plurality of categories includes amounts of memory usage for image files, video files, and document files, respectively.

2. The electronic device of claim 1, wherein the file application is executed based on the first profile, and is configured to use at least one of an authority or a function for identifying the first amount of memory usage associated with the first profile and at least one of an authority or a function for identifying the second amount of memory usage associated with the second profile, wherein the instructions are further executable by the at least one processor to:

in response to detecting selections of the first icon and second icon, executing a first instance of the application that operates in tandem with the first profile but not the second profile, and executing the duplicate as a second instance of the application that operates in tandem with the second profile but not the first profile, and wherein the first instance of the application and the second instance of the application are simultaneously operative.

3. The electronic device of claim 2, wherein the first execution screen includes information about the first amount of memory usage relative to a total capacity of the memory, and information about the second amount of memory usage relative to the total capacity of the memory, and wherein the ability of the electronic device to simultaneously execute the first instance of the application with the duplicate second instance of the application is provided natively by a dual app function included in the operating system.

4. The electronic device of claim 2, wherein the first profile includes a host account, and the second profile includes a guest account, and wherein the instructions, when executed by the at least one processor individually or collectively, cause the electronic device to:

identify a first path for storing a file corresponding to the first profile;

identify a second path for storing a file corresponding to the second profile;

store the at least one first file in the first area corresponding to the first path; and store the at least one second file in the second area corresponding to the second path.

5. The electronic device of claim 4, wherein the instructions, when executed by the at least one processor individually or collectively, cause the electronic device to:

identify the first amount of memory usage based on a difference between a total amount of usage of the memory by the application and the duplicate of the application, and the second amount of memory usage.

6. The electronic device of claim 4, wherein the authority or the function for identifying the second amount of memory usage associated with the second profile includes an authority or a function for requesting information about the second amount of memory usage and/or an authority or a function for accessing the second area corresponding to the identified second path.

7. The electronic device of claim 1, wherein the instructions, when executed by the at least one processor individually or collectively, cause the electronic device to:

identify at least one of information about a lower path of a second path or information about a file of the second path, corresponding to each of the at least one second file, wherein the information about the file includes at least one of a media type or an extension; and identify information about a usage for each of a plurality of categories, based on the identified at least one of the information about the lower path or the information about the file.

8. The electronic device of claim 4, wherein the first execution screen further includes a second object including information about the second amount of memory usage, wherein the second object is configured to, when selected, provide a management function for a file of the second profile, and the management function includes at least one of move, copy, delete, or change name for the file, and wherein the instructions, when executed by the at least one processor individually or collectively, cause the electronic device to:

based on the second object being selected, display a third execution screen of the file application, including the at least one second file and a plurality of objects configured to provide the management function for the at least one second file.

9. The electronic device of claim 8, wherein the instructions, when executed by the at least one processor individually or collectively, cause the electronic device to:

based on the second object being selected, identify a type of the second profile corresponding to the second object;

based on the type of the second profile corresponding to an account of a specific type, display a screen for authentication of the second profile; and when the authentication of the second profile is completed based on the display of the screen, display the third execution screen of the file application.

10. The electronic device of claim 9, wherein the account of the specific type includes at least one of an account corresponding to a secure folder, an account corresponding to a work profile, or an account corresponding to a cloud storage.

11. The electronic device of claim 9, wherein the instructions, when executed by the at least one processor individually or collectively, cause the electronic device to:

based on the authentication of the second profile being completed, configure the file application with an authority or a function for reading from/writing to the second area of the memory corresponding to the second profile.

12. A method of operating an electronic device, the method comprising:

identifying a first profile and a second profile of a user, both the first profile and second profile associated with an application of the electronic device;

display on the display a home screen including a plurality
of selectable icons representing executable applica-
tions, in which the application is represented by two
separate icons,
    a first icon of which is selectable to execute a first
        instance of the application in an operating system of
        the electronic device in tandem with the first profile
        but not the second profile, and
    a second icon of which is selectable to execute a
        duplicate second instance of the application in the
        same operating system as the first instance, in tan-
        dem with the second profile but not the first profile;
storing, by a processor, at least one first file associated
    with the first profile in a first area of a memory of the
    electronic device by the application;
storing at least one second file associated with the second
    profile in a second area of the memory by the duplicate
    of the application;
in response to execution of a file application, identifying
    a first amount of memory usage for the first area of the
    memory and a second amount of memory usage for the
    second area of the memory used by the duplicate of the
    application;
controlling a display of the electronic device to display a
    first execution screen including first information indi-
    cating the first amount of memory usage for the first
    area of the memory, second information indicating the
    second amount of memory usage by the duplicate of the
    application, and a first object configured to provide an
    analysis function for memory usage associated with the
    second profile; and
in response to identifying a touch on the first object,
    controlling the display to display a second execution
    screen of the file application including information
    about amounts of memory usage for a plurality of
    categories of the second profile,
    wherein the plurality of categories comprise an image
        category, a video category, and a document category,
        and
    wherein the information about the amounts of memory
        usage for the plurality of categories includes amounts
        of memory usage for image files, video files, and
        document files, respectively.
13. The method of claim 12, wherein the file application
is executed based on the first profile, and is configured to use
at least one of an authority or a function for identifying the
first amount of memory usage associated with the first
profile and at least one of an authority or a function for
identifying the second amount of memory usage associated
with the second profile,
    wherein the method further comprises: in response to
        detecting selections of the first icon and second icon,
        executing a first instance of the application that oper-
        ates in tandem with the first profile but not the second
        profile, and executing the duplicate as a second
        instance of the application that operates in tandem with
        the second profile but not the first profile, and
    wherein the first instance of the application and the
        second instance of the application are simultaneously
        operative.
14. The method of claim 13, wherein the first execution
screen includes information about the first amount of
memory usage relative to a total capacity of the memory, and
information about the second amount of memory usage
relative to the total capacity of the memory, and
    wherein the ability of the electronic device to simultane-
        ously execute the first instance of the application with the duplicate second instance of the application is
    provided natively by a dual app function included in the
    operating system.
15. The method of claim 13,
wherein the first profile includes a host account, and the
    second profile includes a guest account, and
wherein the method comprises:
identifying a first path for storing a file corresponding to
    the first profile;
identifying a second path for storing a file corresponding
    to the second profile;
storing the at least one first file in the first area corre-
    sponding to the first path; and
storing the at least one second file in the second area
    corresponding to the second path.
16. The method of claim 15, further comprising:
identifying the first amount of memory usage based on a
    difference between a total amount of usage of the
    memory by the application and the duplicate of the
    application, and the second amount of memory usage.
17. A non-transitory computer-readable storage medium
for storing instructions which, when executed by at least one
processor of an electronic device, control the electronic
device to perform:
identifying a first profile and a second profile of a user,
    both the first profile and second profile associated with
    an application of the electronic device;
displaying on a display a home screen including a plu-
    rality of selectable icons representing executable appli-
    cations, in which the application is represented by two
    separate icons,
    a first icon of which is selectable to execute a first
        instance of the application in an operating system of
        the electronic device in tandem with the first profile
        but not the second profile, and
    a second icon of which is selectable to execute a
        duplicate second instance of the application in the
        same operating system as the first instance, in tan-
        dem with the second profile but not the first profile;
storing at least one first file associated with the first profile
    in a first area of a memory of the electronic device by
    the application;
storing at least one second file associated with the second
    profile in a second area of the memory by the duplicate
    of the application;
in response to execution of a file application, identifying
    a first amount of memory usage for the first area of the
    memory and a second amount of memory usage for the
    second area of the memory used by the duplicate of the
    application;
controlling a display of the electronic device to display a
    first execution screen including first information indi-
    cating the first amount of memory usage for the first
    area of the memory, second information indicating the
    second amount of memory usage by the duplicate of the
    application, and a first object configured to provide an
    analysis function for memory usage associated with the
    second profile; and
in response to identifying a touch on the first object,
    controlling the display to display a second execution
    screen of the file application including information
    about amounts of memory usage for a plurality of
    categories of the second profile,
    wherein the plurality of categories comprise an image
        category, a video category, and a document category,
        and wherein the information about the amounts of memory usage for the plurality of categories includes amounts of memory usage for image files, video files, and document files, respectively.

* * * * *